US012726293B2

(12) United States Patent
Liu et al.

(10) Patent No.: US 12,726,293 B2
(45) Date of Patent: Sep. 1, 2026

(54) SERVICE OPTICAL SIGNAL TRANSMISSION METHOD, NETWORK DEVICE, AND OPTICAL NETWORK

(71) Applicant: HUAWEI TECHNOLOGIES CO., LTD., Shenzhen (CN)

(72) Inventors: Chen Liu, Dongguan (CN); Guangcan Mi, Shenzhen (CN); Zeshan Chang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 18/541,452

(22) Filed: Dec. 15, 2023

(65) Prior Publication Data

US 2024/0113799 A1 Apr. 4, 2024

Related U.S. Application Data

(63) Continuation of application No. PCT/CN2022/079490, filed on Mar. 7, 2022.

(30) Foreign Application Priority Data

Jun. 21, 2021 (CN) ......................... 202110687761.9

(51) Int. Cl.
*H04J 14/02* (2006.01)
*H04B 10/294* (2013.01)
*H04Q 11/00* (2006.01)

(52) U.S. Cl.
CPC ........ *H04J 14/0212* (2013.01); *H04B 10/294* (2013.01); *H04Q 11/0005* (2013.01); *H04Q 2011/0007* (2013.01)

(58) Field of Classification Search
CPC ............... H04J 14/0212; H04B 10/294; H04Q 11/0005; H04Q 2011/0007
See application file for complete search history.

(56) References Cited

U.S. PATENT DOCUMENTS

2003/0194235 A1 10/2003 Zami
2010/0098412 A1* 4/2010 Boyd .................. H04J 14/0272 398/48

(Continued)

FOREIGN PATENT DOCUMENTS

EP 1309118 A1 5/2003
JP H06121357 A 4/1994

OTHER PUBLICATIONS

Extended European Search Report in European Appln. No. 22827052.6, mailed on Oct. 8, 2024, 10 pages.

(Continued)

*Primary Examiner* — Pranesh K Barua
(74) *Attorney, Agent, or Firm* — Fish & Richardson P.C.

(57) ABSTRACT

The present disclosure describes a service optical signal transmission method, a network device, and an optical network. A network device includes a light source module. The light source module is connected to a plurality of wavelength selection modules. Each of the plurality of wavelength selection modules is connected to a respective first optical transceiver, and different wavelength selection modules are connected to different first optical transceivers. The light source module transmits M first optical signals to each of the plurality of wavelength selection modules, where M is a positive integer greater than 1. Each of the plurality of wavelength selection modules transmits K second optical signals to the respective first optical transceiver, where K is a positive integer less than or equal to M. The respective first optical transceiver modulates a service electrical signal on each of the K second optical signals to output K service optical signals.

20 Claims, 8 Drawing Sheets

(56) References Cited

U.S. PATENT DOCUMENTS

2014/0126905 A1* 5/2014 Yonenaga ........... H04L 27/2697
398/48
2021/0352385 A1* 11/2021 Thollabandi ........ H04J 14/0238

OTHER PUBLICATIONS

International Search Report and Written Opinion in International Appln. No. PCT/CN2022/079490, mailed on May 19, 2022, 15 pages (with English translation).

* cited by examiner

SERVICE OPTICAL SIGNAL TRANSMISSION METHOD, NETWORK DEVICE, AND OPTICAL NETWORK

CROSS-REFERENCE TO RELATED APPLICATIONS

This application is a continuation of International Application No. PCT/CN2022/079490, filed on Mar. 7, 2022, which claims priority to Chinese Patent Application No. 202110687761.9, filed on Jun. 21, 2021. The disclosures of the aforementioned applications are hereby incorporated by reference in their entireties.

TECHNICAL FIELD

This application relates to the field of fiber communication technologies, and in particular, to a service optical signal transmission method, a network device, and an optical network.

BACKGROUND

A data center is cascaded with a plurality of network devices. Each network device includes a plurality of transceiver modules. Two transceiver modules may be connected by using an optical switching module, and the optical switching module implements cross-connection of an optical signal between the two transceiver modules. The optical switching module can cross, to a corresponding output port based on a wavelength of an optical signal input through an input port, the optical signal input through the input port. Therefore, in the conventional technology, an independent wavelength-tunable laser is configured in each transceiver module, and the transceiver module emits optical signals with different wavelengths by using the wavelength-tunable laser.

However, configuring the wavelength-tunable laser for each transceiver module significantly increases costs, and time required by the wavelength-tunable laser to tune a wavelength is in milliseconds or even seconds. Consequently, a network latency is increased. A wavelength of an optical signal output by each transceiver module is independently tuned by the laser. A case in which optical signals output by two transceiver modules are simultaneously transmitted to a same output port by the optical switching module due to asynchronous wavelength tuning is prone to occur. Consequently, network congestion occurs or even data transmission is interrupted.

SUMMARY

This application provides a service optical signal transmission method, a network device, and an optical network, to reduce networking costs and a latency, and effectively avoid congestion of optical signal transmission.

According to a first aspect, an embodiment of the present invention provides a service optical signal transmission method. The transmission method is applied to a network device. The network device includes a light source module. The light source module is connected to a plurality of wavelength selection modules. Each wavelength selection module is connected to one first optical transceiver, and different wavelength selection modules are connected to different first optical transceivers. The light source module transmits M first optical signals to each wavelength selection module, where M is a positive integer greater than 1. The wavelength selection module transmits K second optical signals to the first optical transceiver, where K is a positive integer less than or equal to M. The first optical transceiver modulates a service electrical signal on each second optical signal to output K service optical signals. N first optical transceivers are connected to at least one second optical transceiver by using at least one optical switching module. The at least one optical switching module is configured to transmit K service optical signals from the N first optical transceivers to the at least one second optical transceiver.

It can be learned that, when different computing tasks are executed, only the wavelength selection module needs to change a wavelength of the second optical signal transmitted to the first optical transceiver connected to the selection module, so that the first optical transceiver transmits service optical signals to different second optical transceivers. It can be learned that, the first optical transceiver exchanges data with the different second optical transceivers based on the different computing tasks, so that a network architecture of an optical network does not need to be changed. This reduces networking costs.

A wavelength-tunable laser does not need to be independently configured for each first optical transceiver. This reduces costs of the first optical transceiver. The first optical transceiver directly performs modulation based on the second optical signal from the wavelength selection module. This reduces a network latency.

In addition, because each first optical transceiver is connected to one wavelength selection module, each wavelength selection module can independently transmit the second optical signal to the first optical transceiver connected to the wavelength selection module. This improves a wavelength resource utilization of the M first optical signals output by the light source module.

Based on the first aspect, in an optional implementation, a plurality of first optical transceivers are in one-to-one correspondence with a plurality of output ports of a same optical switching module. The first optical transceiver is configured to transmit the service optical signal to the output port corresponding to the optical switching module.

It can be learned that, each wavelength selection module independently allocates a wavelength to the first optical transceiver connected to the wavelength selection module. This can ensure that the service optical signal output by the first optical transceiver can be transmitted to a corresponding second optical transceiver through crossing of the optical switching module. It can be ensured that a same output port of the optical switching module receives only a service optical signal from one first optical transceiver corresponding to the output port. In this case, service optical signals from different first optical transceivers are not transmitted to the same output port of the optical switching module. This avoids network congestion.

Based on the first aspect, in an optional implementation, the output port that is of the optical switching module and that is configured to output the service optical signal is related to a wavelength of the service optical signal and an input port that is of the optical switching module and that is configured to receive the service optical signal.

It can be learned that, the optical switching module determines, based on the input port for receiving the service optical signal and the wavelength of the service optical signal, the output port configured to output the service optical signal, so that the service optical signal output by the first optical transceiver can be transmitted to the corresponding second optical transceiver.

Based on the first aspect, in an optional implementation, each wavelength selection module can independently select a target wavelength for the first optical transceiver, and the selected target wavelength is not limited by another wavelength selection module. It can be learned that, different wavelength selection modules may send second optical signals with a same wavelength to different first optical transceivers. Alternatively, different wavelength selection modules may send second optical signals with different wavelengths to different first optical transceivers.

It can be learned that, because the different first optical transceivers may use the second optical signals with the same wavelength, utilization efficiency of the M first optical signals output by the light source module is effectively improved.

Based on the first aspect, in an optional implementation, the wavelength selection module transmits a second optical signal having a target wavelength to a target output port of the wavelength selection module. The target wavelength is determined based on a routing requirement of the service optical signal, and the target output port has a correspondence with the target wavelength.

It can be learned that, the light source module separately sends the M first optical signals to the wavelength selection module, and the wavelength selection module is responsible for transmitting the second optical signal having the target wavelength. The second optical signal having the target wavelength can meet the routing requirement of the service optical signal output by the first optical transceiver. In addition, the wavelength selection module does not need to perform an action of querying a corresponding target wavelength and target output port each time the wavelength selection module executes a computing task. This improves efficiency of optical signal transmission.

Based on the first aspect, in an optional implementation, that the wavelength selection module transmits K second optical signals to the first optical transceiver includes: The wavelength selection module obtains a current configuration list, where the current configuration list includes a correspondence between a target wavelength and the first optical transceiver, and the target wavelength is a wavelength to be transmitted to the wavelength selection module; and the wavelength selection module transmits a second optical signal having the target wavelength to the first optical transceiver based on the current configuration list.

It can be learned that, when different computing tasks are executed, only the wavelength selection module needs to change a wavelength of the second optical signal transmitted to the first optical transceiver, so that the first optical transceiver transmits service optical signals to different second optical transceivers. In addition, in a process in which the first optical transceiver exchanges data with the different second optical transceivers based on the different computing tasks, a network architecture of an optical network does not need to be changed. This reduces networking costs.

Based on the first aspect, in an optional implementation, the network device includes a control unit connected to the wavelength selection module. The method further includes: The control unit obtains a plurality of configuration lists; the control unit obtains a routing requirement, where the routing requirement includes a source node and a destination node of the service optical signal, the source node is connected to the first optical transceiver, and the destination node is connected to a second optical transceiver; the control unit obtains the current configuration list corresponding to the routing requirement, where a service optical signal output by the first optical transceiver and has the target wavelength is transmitted to the second optical transceiver by using the optical switching module; and the control unit sends the current configuration list to the wavelength selection module.

Based on the first aspect, in an optional implementation, that the wavelength selection module obtains a current configuration list includes: The wavelength selection module obtains a plurality of configuration lists; the wavelength selection module obtains a routing requirement, where the routing requirement includes a source node and a destination node of the service optical signal, the source node is connected to the first optical transceiver, and the destination node is connected to a second optical transceiver; and the wavelength selection module obtains the current configuration list corresponding to the routing requirement, where a service optical signal output by the first optical transceiver and has the target wavelength is transmitted to the second optical transceiver by using the optical switching module.

Based on the first aspect, in an optional implementation, that the wavelength selection module transmits a second optical signal having the target wavelength to the first optical transceiver based on the current configuration list includes: The wavelength selection module conducts an optical path between a target input port and a target output port of the wavelength selection module based on the current configuration list, where the target input port is an input port configured to input a first optical signal having the target wavelength, and the target output port is an output port configured to output the second optical signal having the target wavelength to the first optical transceiver.

Based on the first aspect, in an optional implementation, the wavelength selection module further includes at least one optical filter, and that the wavelength selection module transmits K second optical signals to the first optical transceiver includes: The wavelength selection module obtains the K second optical signals by filtering the M first optical signals by using the at least one optical filter.

Based on the first aspect, in an optional implementation, the network device includes the control unit connected to the wavelength selection module, and that the light source module transmits M first optical signals to the wavelength selection module includes: The control unit controls the light source module to output the first optical signal having the target wavelength.

It can be learned that, because the light source module can transmit the first optical signal having the target wavelength to the wavelength selection module, a routing requirement of the first optical transceiver can be effectively met.

Based on the first aspect, in an optional implementation, different wavelength selection modules receive the M first optical signals at different moments.

According to a second aspect, an embodiment of the present invention provides a network device. The network device includes a light source module. The light source module is connected to a plurality of wavelength selection modules. Each wavelength selection module is connected to one first optical transceiver, and different wavelength selection modules are connected to different first optical transceivers. The light source module is configured to transmit M first optical signals to each wavelength selection module, where M is a positive integer greater than 1. The wavelength selection module is configured to transmit K second optical signals to the first optical transceiver, where K is a positive integer less than or equal to M. The first optical transceiver is configured to modulate a service electrical signal on each second optical signal to output K service optical signals.

For descriptions of beneficial effects shown in this aspect, refer to the first aspect. Details are not described again.

Based on the second aspect, in an optional implementation, a plurality of first optical transceivers are in one-to-one correspondence with a plurality of output ports of a same optical switching module. The first optical transceiver is configured to transmit the service optical signal to the output port corresponding to the optical switching module.

Based on the second aspect, in an optional implementation, the output port that is of the optical switching module and that is configured to output the service optical signal is related to a wavelength of the service optical signal and an input port that is of the optical switching module and that is configured to receive the service optical signal.

Based on the second aspect, in an optional implementation, the wavelength selection module is specifically configured to transmit a second optical signal having a target wavelength to the first optical transceiver, where the target wavelength is a wavelength to be transmitted to the wavelength selection module.

Based on the second aspect, in an optional implementation, the wavelength selection module is specifically configured to: obtain a current configuration list, where the current configuration list includes a correspondence between a target wavelength and the first optical transceiver, and the target wavelength is a wavelength to be transmitted to the wavelength selection module; and transmit a second optical signal having the target wavelength to the first optical transceiver based on the current configuration list.

Based on the second aspect, in an optional implementation, the network device includes a control unit connected to the wavelength selection module. The control unit is specifically configured to: obtain a plurality of configuration lists; obtain a routing requirement, where the routing requirement includes a source node and a destination node of the service optical signal, the source node is connected to the first optical transceiver, and the destination node is connected to a second optical transceiver; obtain the current configuration list corresponding to the routing requirement, where a service optical signal output by the first optical transceiver and has the target wavelength is transmitted to the second optical transceiver by using the optical switching module; and send the current configuration list to the wavelength selection module.

Based on the second aspect, in an optional implementation, the wavelength selection module is specifically configured to: obtain a plurality of configuration lists; obtain a routing requirement, where the routing requirement includes a source node and a destination node of the service optical signal, the source node is connected to the first optical transceiver, and the destination node is connected to a second optical transceiver; and obtain the current configuration list corresponding to the routing requirement, where a service optical signal output by the first optical transceiver and has the target wavelength is transmitted to the second optical transceiver by using the optical switching module.

Based on the second aspect, in an optional implementation, the wavelength selection module is specifically configured to conduct an optical path between a target input port and a target output port of the wavelength selection module based on the current configuration list, where the target input port is an input port configured to input a first optical signal having the target wavelength, and the target output port is an output port configured to output the second optical signal having the target wavelength to the first optical transceiver.

Based on the second aspect, in an optional implementation, the wavelength selection module further includes at least one optical filter. The wavelength selection module is specifically configured to obtain the K second optical signals by filtering the M first optical signals by using the at least one optical filter.

Based on the second aspect, in an optional implementation, the network device includes the control unit connected to the wavelength selection module. The control unit is specifically configured to control the light source module to output the first optical signal having the target wavelength.

Based on the second aspect, in an optional implementation, different wavelength selection modules receive the M first optical signals at different moments.

According to a third aspect, an embodiment of the present invention provides an optical network. The optical network includes a plurality of optical transceivers. The plurality of optical transceivers include N first optical transceivers and at least one second optical transceiver. The N first optical transceivers are connected to the at least one second optical transceiver by using at least one optical switching module. The N first optical transceivers are located in a network device, and the network device is shown in any implementation of the second aspect. The at least one optical switching module is configured to transmit K service optical signals from the N first optical transceivers to the at least one second optical transceiver.

For descriptions of beneficial effects of this aspect, refer to the first aspect. Details are not described again.

Based on the third aspect, in an optional implementation, the N first optical transceivers and the second optical transceiver are located in the same network device, or the N first optical transceivers and the second optical transceiver are located in different network devices.

DESCRIPTION OF EMBODIMENTS

The following clearly and completely describes the technical solutions in embodiments of the present invention with reference to the accompanying drawings in embodiments of the present invention. It is clear that the described embodiments are merely some rather than all of embodiments of the present invention. All other embodiments obtained by persons skilled in the art based on embodiments of the present invention without creative efforts shall fall within the protection scope of the present invention.

Embodiment 1

Figure 1:
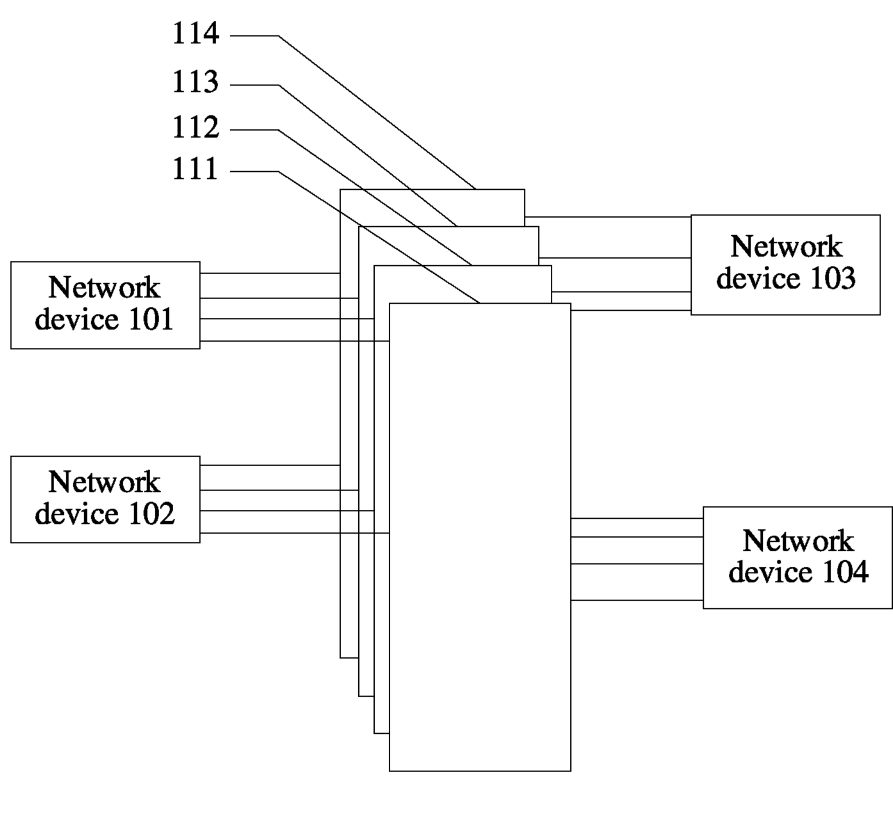
FIG. 1 is an example diagram of a structure of an embodiment of an optical network according to this application.

The following first describes, with reference to FIG. 1, a structure of an optical network to which this application is applied. FIG. 1 is an example diagram of a structure of an embodiment of an optical network according to this application.

The optical network shown in this embodiment has advantages such as a high switching speed, a low loss on optical power, a low latency, low costs, and no wavelength competition. The optical network shown in this embodiment may be used in applications such as a data center, a metropolitan area network, a passive optical network (PON), and long-distance transmission. This is not specifically limited in this embodiment. In this embodiment, an example in which the optical network is used in the data center is used, and the optical network may be a data center network (DCN).

As shown in FIG. 1, the optical network shown in this embodiment includes a plurality of network devices. An example in which the optical network includes a network device 101, a network device 102, a network device 103, and a network device 104 is used in FIG. 1. It should be noted that, descriptions of a quantity of network devices included in the optical network and a connection manner in this embodiment are optional examples, and are not limited. The network device shown in this embodiment may also be referred to as a server.

When the optical network executes a service, different network devices need to be capable of exchanging data. For example, if the optical network shown in this embodiment is configured to execute an artificial intelligence (AI) training service, where it can be learned that the AI training service is a computationally intensive service, data exchange needs to be performed between the plurality of network devices included in the optical network to implement the AI training service.

To implement data exchange between the plurality of network devices, as shown in FIG. 1, any two of the network device 101, the network device 102, the network device 103, and the network device 104 are connected by using an optical switching module. For example, the network device 101 has four ports, a first port of the network device 101 is connected to an optical switching module 111, a second port of the network device 101 is connected to an optical switching module 112, a third port of the network device 101 is connected to an optical switching module 113, and a fourth port of the network device 101 is connected to an optical switching module 114. For descriptions of connection relationships between the network device 102, the network device 103, and the network device 104 and the optical switching module, refer to the descriptions of the network device 101. Details are not described again. It can be learned that, any two network devices can perform data exchange. For example, data output by the first port of the network device 101 can be transmitted to a first port of the network device 103 through crossing of the optical switching module 111, to send the data by the network device 101 to the network device 103. For descriptions of data exchange between other network devices, refer to the descriptions of data exchange between the network device 101 and the network device 103. Details are not described again.

It should be further noted that, descriptions of a quantity of optical switching modules and descriptions of a connection relationship between the optical switching module and a port of each network device in this embodiment are optional examples, and are not limited. The optical switching module shown in this embodiment may be referred to as a wavelength-sensitive optical switch (WS-OXC), a reconfigurable optical add/drop multiplexer (ROADM), a wavelength crossconnect (WXC), an optical switching node, a wavelength switching node, or the like. This is not specifically limited in this embodiment. Each optical switching module may be implemented based on a wavelength division technology such as a wavelength selective switch (WSS), an arrayed waveguide grating (AWG), or an arrayed waveguide grating router (AWGR). It can be learned that, because the optical switching module is implemented based on the wavelength division technology, when wavelengths of optical signals received by the optical switching module are different, the optical signals having different wavelengths may be transmitted along different paths in the optical switching module, so that the optical signals having different wavelengths can be output through different output ports of the optical switching module.

Figure 2:
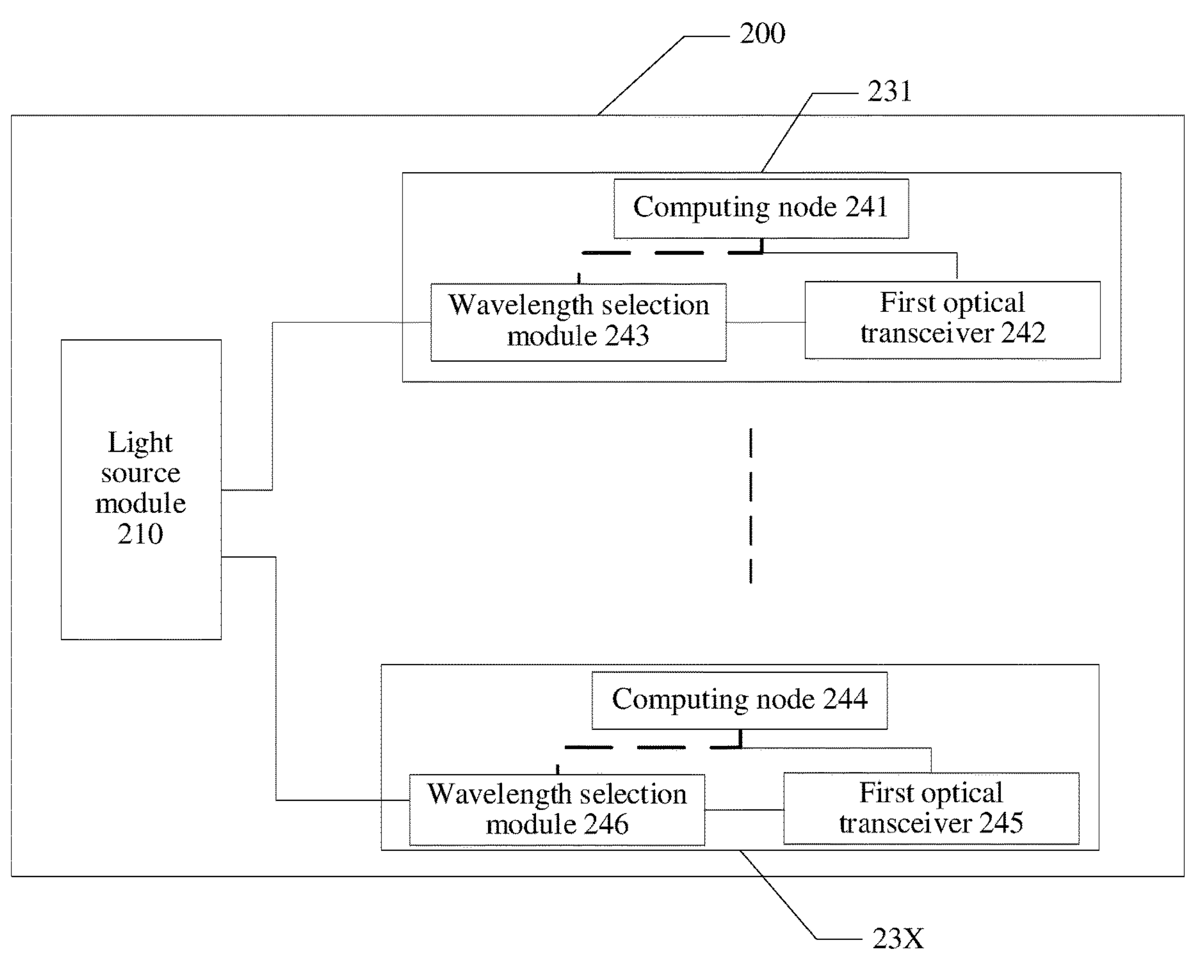
FIG. 2 is an example diagram of a structure of a first embodiment of a network device according to this application.

Based on the optical network shown in FIG. 1, the following describes, with reference to FIG. 2, a structure of each network device included in the optical network shown in this application. FIG. 2 is an example diagram of a structure of a first embodiment of a network device according to this application.

The network device 200 shown in this embodiment includes a light source module 210 and X transceiver modules connected to the light source module 210. A value of X shown in this embodiment is any positive integer greater than or equal to 1. For example, the X transceiver modules may be a transceiver module 231 to a transceiver module 23X that are connected to the light source module 210.

The transceiver module may include one or more computing nodes. In this embodiment, the transceiver module 231 is used as an example. The transceiver module 231 includes one computing node 241. The computing node 241 shown in this embodiment is a node that can execute a computing task. For example, the computing node 241 may be a graphics processing unit (GPU), a field-programmable gate array (FPGA), an application-specific integrated circuit (ASIC), a system on chip (SoC), a central processing unit (CPU), a network processor (NP), a digital signal processor (DSP), another integrated chip, or any combination of the foregoing chips or processors.

The transceiver module shown in this embodiment includes a wavelength selection module 243 connected to the light source module 210. This embodiment is described by using an example in which the wavelength selection module 243 is connected to the computing node 241. In another example, if the network device includes an independently disposed control unit, that the control unit is independently disposed means that the control unit is separately connected to the light source module 210 and each transceiver module. For descriptions of an implementation of the control unit, refer to the descriptions of the implementation of the computing node 241. Details are not described again. In this example, the wavelength selection module 243 included in each transceiver module is connected to the independently disposed control unit.

The transceiver module further includes one or more first optical transceivers separately connected to the wavelength selection module 243 and the computing node, for example, a first optical transceiver 242 connected to the computing node 241 and the wavelength selection module 243 in the transceiver module 231. Similarly, the transceiver module 23X includes a wavelength selection module 246 connected to the light source module 210 and a computing node 244 connected to the wavelength selection module 246, and further includes a first optical transceiver 245 separately connected to the computing node 244 and the wavelength selection module 246.

The "connection" shown above may specifically mean that two optical components (for example, the light source module 210 and each transceiver module) are connected via a fiber or an optical waveguide, to implement optical signal transmission.

The following describes the optical components included in the network device shown in this embodiment.

First, a structure of the light source module 210 is described.

The light source module 210 shown in this embodiment is configured to send M first optical signals to each wavelength selection module. A value of M is any positive integer greater than 1. The M first optical signals are continuous wave (CW) optical signals. The light source module 210 shown in this embodiment may be connected to each wavelength selection module via one fiber. In this case, wavelengths of the M first optical signals sent by the light source module 210 to the wavelength selection module are different from each other. The wavelengths of the M first optical signals are respectively λ1, λ2, to λM. For another example, the light source module 210 shown in this embodiment may be connected to each wavelength selection module via two or more fibers. In this case, wavelengths of at least some of the M first optical signals may be the same, and wavelengths of two first optical signals whose wavelengths are the same may be transmitted to the wavelength selection module via different fibers. This is not specifically limited in this embodiment. For an implementation of the light source module 210 shown in this embodiment, refer to the following.

Figure 3:
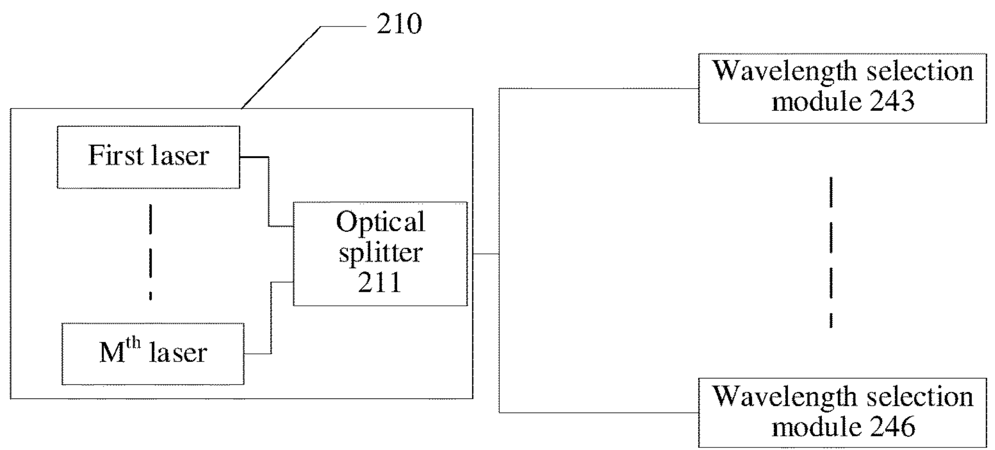
FIG. 3 is an example diagram of a partial structure of a second embodiment of a network device according to this application.

FIG. 3 is an example diagram of a partial structure of a second embodiment of a network device according to this application. The light source module 210 includes a plurality of lasers with fixed wavelengths. For example, the light source module 210 is configured to send M first optical signals with different wavelengths to each wavelength selection module (for example, the wavelength selection module 243). In this case, the light source module 210 may include M lasers configured to output first optical signals having different wavelengths. For example, the light source module 210 includes a first laser configured to output a first optical signal with a wavelength of λ1, and by analogy, the light source module 210 includes an $M^{th}$ laser configured to output a first optical signal with a wavelength of λM. The light source module 210 further includes an optical splitter 211 connected to each laser. The optical splitter 211 shown in this embodiment may also be referred to as a fiber coupler. The optical splitter 211 is configured to split, into a plurality of parts, the M first optical signals received from the M lasers, where each part includes the M first optical signals. The light source module 210 transmits each part of the M first optical signals to one wavelength selection module, to ensure that each wavelength selection module can receive the M first optical signals from the light source module 210. The descriptions of a type of the laser included in the light source module 210 in this embodiment are optional examples, and are not limited. For example, in another example, the laser included in the light source module 210 may alternatively be a wavelength-tunable laser, a semiconductor mode-locked laser, a mode-locked diode laser, a distributed Bragg reflector laser, a fiber-coupled semiconductor laser, a fiber laser, or the like. When the laser included in the light source module 210 is the semiconductor mode-locked laser, the M first optical signals output by the semiconductor mode-locked laser are optical frequency combs. It can be learned that, the M first optical signals output by the light source module 210 are a series of comb-shaped spectral lines that are evenly distributed in frequency domain, have fixed positions, and have an extremely wide spectral range.

It should be noted that the descriptions of the optical component included in the light source module 210 in this embodiment are optional examples. In another example, the light source module 210 may further include one or more multiplexers. The multiplexer is configured to multiplex a plurality of first optical signals to form a multiplexed optical signal. The multiplexed optical signal can be output through a same output port of the light source module. For example, the multiplexer receives the first optical signal with a wavelength of λ1 and a first optical signal with a wavelength of λ2. The multiplexer multiplexes the first optical signal with the wavelength of λ1 and the first optical signal with the wavelength of λ2 to obtain a multiplexed optical signal. The multiplexed optical signal having the wavelengths λ1 and λ2 can be output through a same output port of the light source module 210, to be transmitted to the wavelength selection module. For another example, the light source module may further include one or more power dividers. The power divider is configured to divide optical power of an optical signal from a laser to obtain a plurality of first optical signals with equal or unequal optical power. For another example, the light source module may further include an optical power amplifier, to amplify optical power of a to-be-output first optical signal.

The light source module 210 shown in this embodiment has a plurality of output ports, and one or more output ports are connected to an input port of a same wavelength selection module, to ensure that the M first optical signals output through the one or more output ports can be successfully transmitted to the wavelength selection module.

It can be learned that, the light source module 210 can adjust, by using the foregoing optical component included in the light source module 210, a wavelength combination of a first optical signal output by each output port included in the light source module 210. For example, one output port can output a plurality of first optical signals having a plurality of different wavelengths by using the multiplexer. For another example, different output ports can output first optical signals having different wavelengths from a same laser by using a demultiplexer. For another example, different output ports can output first optical signals with a same wavelength and same or different optical power by using the power divider. The optical component included in the light source module 210 is not limited in this embodiment, provided that each first optical transceiver included in the network device can receive the M first optical signals from the light source module 210.

The following describes a specific structure of the wavelength selection module shown in this embodiment.

The wavelength selection module shown in this embodiment is configured to transmit K second optical signals to the first optical transceiver connected to the wavelength selection module. The K second optical signals output by the wavelength selection module are at least some of the M first optical signals. A value of K is any positive integer less than or equal to M. For example, the wavelength selection module 243 shown in FIG. 2 transmits the K second optical signals to the first optical transceiver 242. Specifically, the wavelength selection module 243 already receives the M first optical signals from the light source module 210, and the wavelength selection module 243 performs selection on the M first optical signals, to transmit, to the first optical transceiver 242, the K second optical signals included in the M first optical signals. The first optical transceiver 242 is configured to transmit an optical signal from the light source module 210 to a second optical transceiver. It can be learned that, the first optical transceiver shown in this embodiment is used as a transmit end of the optical signal, and the second optical transceiver is used as a receive end of the optical signal. In addition, the first optical transceiver and the second optical transceiver may be located in a same network device, or the first optical transceiver and the second optical transceiver may be located in two different network devices.

Each first optical transceiver receives one or more second optical signals, and the first optical transceiver is configured to modulate a service electrical signal on each second optical signal to obtain one or more service optical signals. For example, as shown in FIG. 2, the first optical transceiver 242 is connected to the computing node 241. The first optical transceiver 242 can receive the K second optical signals from the wavelength selection module 243, and modulate, on each second optical signal, a service electrical signal from the computing node 241 to output K service optical signals.

It can be learned that, if the first optical transceiver 242 receives one second optical signal from the wavelength selection module 243, the first optical transceiver 242 can modulate one service electrical signal from the computing node 241 on the second optical signal, and the first optical transceiver 242 outputs one service optical signal. If the first optical transceiver 242 receives a plurality of second optical signals from the wavelength selection module 243, the first optical transceiver 242 can respectively modulate a plurality of service electrical signals from the computing node 241 on the plurality of second optical signals, and the first optical transceiver 242 outputs a plurality of service optical signals. It can be learned that, for a transceiver module, a computing node included in the transceiver module sends a plurality of service electrical signals to a first optical transceiver included in the transceiver module, so that bandwidth output by the computing node can be effectively extended. For example, each service electrical signal is a signal with switching bandwidth of 25 Gbps (giga bit per second, Gbps). When the computing node outputs four service electrical signals to the first optical transceiver, data transmission with 100 Gbps bandwidth can be implemented.

N first optical transceivers 242 in this embodiment each include an optical modulator. The optical modulator is configured to modulate, on the second optical signal, the service electrical signal from the computing node to obtain the service optical signal. A type of the optical modulator shown in this embodiment is not limited. For example, the optical modulator may be an acousto-optic modulator, a magneto-optic modulator, an electro-optic modulator, or an electro-ab sorption modulator.

Figure 4:
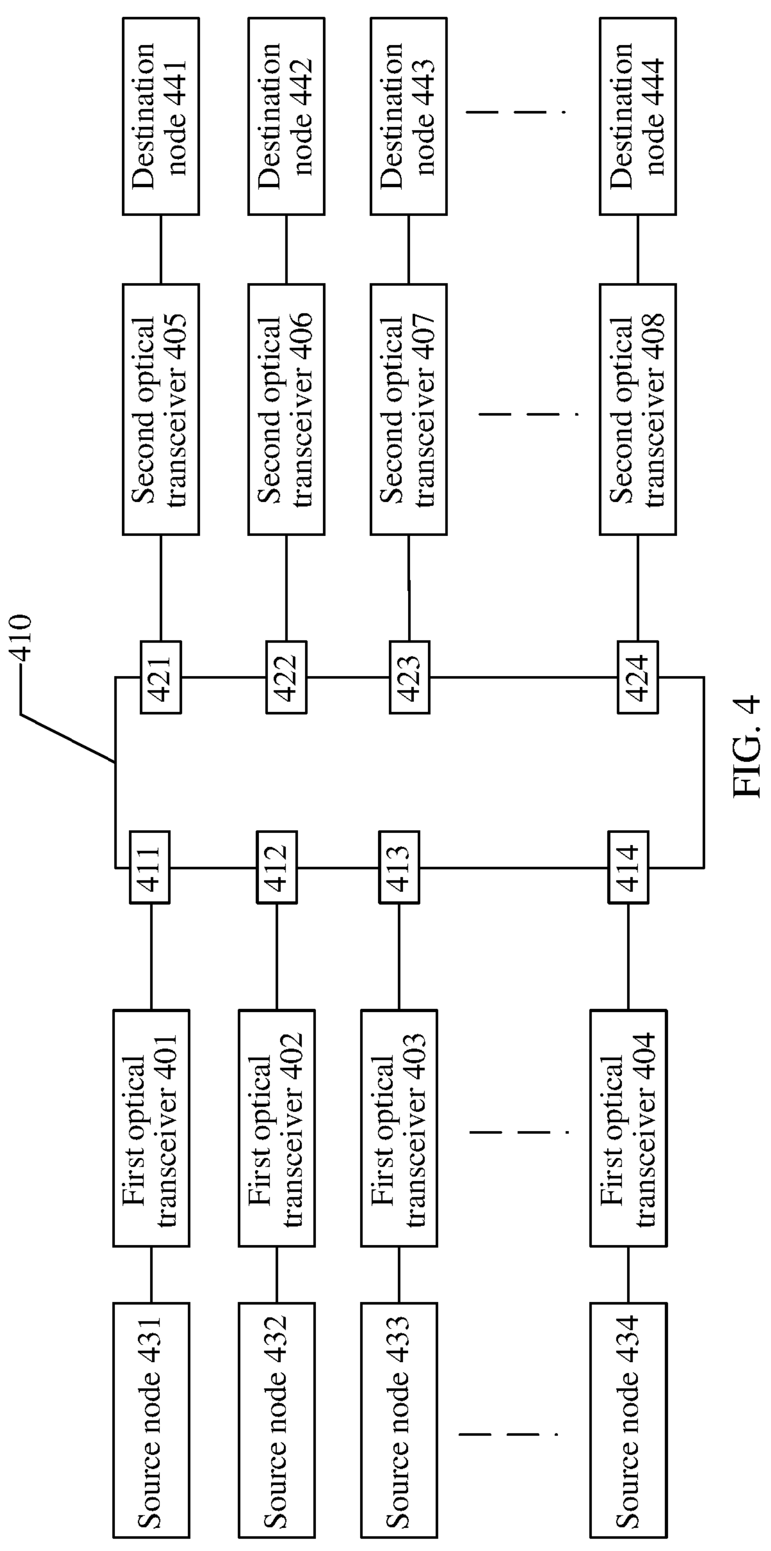
FIG. 4 is an example diagram of a structure of another embodiment of an optical network according to this application.

The following describes the optical switching module with reference to FIG. 4. FIG. 4 is an example diagram of a structure of another embodiment of an optical network according to this application.

As shown in FIG. 4, a plurality of optical transceivers include a first optical transceiver 401, a first optical transceiver 402, a first optical transceiver 403, and a first optical transceiver 404, which are used as transmit ends, and further include a second optical transceiver 405, a second optical transceiver 406, a second optical transceiver 407, and a second optical transceiver 408, which are used as receive ends. Each optical transceiver is connected to an optical switching module 410, and data exchange between any first optical transceiver and any second optical transceiver shown in FIG. 4 can be implemented based on the optical switching module. For example, a service optical signal output by the first optical transceiver 401 can be transmitted to the second optical transceiver 407 through crossing of the optical switching module 410, to implement data exchange between the first optical transceiver 401 and the second optical transceiver 407. It can be learned from the descriptions shown in FIG. 1 that, when wavelengths of service optical signals received by a same input port of the optical switching module 410 are different, the optical switching module 410 can transmit the service optical signals having different wavelengths to different second optical transceivers.

For example, the optical switching module 410 has four input ports, namely, an input port 411, an input port 412, an input port 413, and an input port 414. The four input ports are respectively connected to the first optical transceiver 401, the first optical transceiver 402, the first optical transceiver 403, and the first optical transceiver 404 in one-to-one correspondence. The optical switching module 410 has four output ports, namely, an output port 421, an output port 422, an output port 423, and an output port 424. The four output ports are respectively connected to the second optical transceiver 405, the second optical transceiver 406, the second optical transceiver 407, and the second optical transceiver 408 in one-to-one correspondence. It should be noted that, the descriptions of a connection relationship between the optical switching module 410 and the plurality of optical transceivers shown in FIG. 4 are optional examples, and are not limited.

Optionally, different optical transceivers shown in FIG. 4 may be located in different network devices; all the optical transceivers shown in FIG. 4 may be located in a same network device; or some optical transceivers shown in FIG. 4 are located in one network device, and the other optical transceivers are located in one or more other network devices. It can be learned that, a quantity of network devices in which all the optical transceivers shown in FIG. 4 are located is not limited in this embodiment.

That the optical switching module 410 is a WS-OXC is used as an example. The optical switching module 410 pre-configures a cross correspondence, and the cross correspondence indicates a correspondence between the input port of the optical switching module 410, a wavelength of a service optical signal, and the output port of the optical switching module 410. It can be learned that, the cross correspondence establishes a correspondence between a wavelength of a service optical signal output by a first optical transceiver, an input port that is of the optical switching module 410 and that is connected to the first optical transceiver, and an output port of the optical switching module 410. In addition, in the cross correspondence, output ports of a same optical switching module 410 correspond to only service optical signals from one optical transceiver, to avoid congestion. Based on the cross correspondence, for a service optical signal input through an input port, the optical switching module 410 can transmit, based on the input port and a wavelength of the service optical signal, the service optical signal to an output port that corresponds to the input port and the wavelength in the cross correspondence. For example, for a cross correspondence configured by the optical switching module 410 for the input port 411, refer to the following Table 1.

TABLE 1

| Input port | Wavelength of a service optical signal | Output port |
|---|---|---|
| 411 | λ1 | Output port 421 |
| 411 | λ2 | Output port 422 |
| 411 | λ3 | Output port 423 |
| 411 | λ4 | Output port 424 |

It can be learned that, to ensure that the service optical signal output by the first optical transceiver 401 can be transmitted to the second optical transceiver 407, a wavelength of the service optical signal output by the first optical transceiver 401 needs to be λ3. The optical switching module 410 receives, through the input port 411, the service optical signal having the wavelength λ3 from the first optical transceiver 401, and the optical switching module 410 crosses the service optical signal having the wavelength of λ3 to the output port 423, where the output port 423 is connected to the second optical transceiver 407. It can be learned that, the service optical signal having the wavelength λ3 from the first optical transceiver 401 can be transmitted to the second optical transceiver 407 through the output port 423. Similarly, to ensure that the service optical signal output by the first optical transceiver 401 can be transmitted to the second optical transceiver 405, a wavelength of the service optical signal output by the first optical transceiver 401 needs to be λ1. The optical switching module 410 receives, through the input port 411, the service optical signal having the wavelength λ1 from the first optical transceiver 401, and the optical switching module 410 crosses the service optical signal having the wavelength of λ1 to the output port 421, where the output port 421 is connected to the second optical transceiver 405. It can be learned that, the service optical signal having the wavelength λ1 from the first optical transceiver 401 can be transmitted to the second optical transceiver 405 through the output port 421. Deduction may be performed by analog. This is not limited.

The optical switching module 410 may further configure cross correspondences for the input port 412, the input port 413, and the input port 414. For specific descriptions, refer to the descriptions of the cross correspondence configured for the input port 411. Details are not described again.

It can be learned from the descriptions shown in FIG. 4 that, the first optical transceiver transmits the service optical signal to the second optical transceiver, and a wavelength of a second optical signal received by the first optical transceiver may be a preset wavelength (for example, λ1 to λ4 in Table 1). For example, if the service optical signal output by the first optical transceiver 401 is transmitted to the second optical transceiver 407, the wavelength of the second optical signal received by the first optical transceiver 401 is λ3, so that the wavelength of the service optical signal output by the first optical transceiver 401 is λ3, to further ensured that the service optical signal is transmitted to the second optical transceiver 407 through crossing of the optical switching module 410. The following describes a manner in which the first optical transceiver can receive a second optical signal with a specific wavelength.

As shown in FIG. 2, the wavelength selection module can transmit a second optical signal having a target wavelength to the first optical transceiver based on a routing requirement of the service optical signal output by the first optical transceiver connected to the wavelength selection module. The routing requirement of the service optical signal refers to a source node (namely, a computing node) needs to send a service electrical signal carried in the service optical signal to a destination node (namely, a computing node) that receives the service electrical signal. With reference to FIG. 4, a source node 431 connected to the first optical transceiver 401 is a computing node connected to the first optical transceiver 401. Similarly, a source node 432 connected to the first optical transceiver 402 is a computing node connected to the first optical transceiver 402. A source node 433 connected to the first optical transceiver 403 is a computing node connected to the first optical transceiver 403. A source node 434 connected to the first optical transceiver 404 is a computing node connected to the first optical transceiver 404. A destination node 441 connected to the second optical transceiver 405 is a computing node connected to the second optical transceiver 405. Similarly, a destination node 442 connected to the second optical transceiver 406 is a computing node connected to the second optical transceiver 406. A destination node 443 connected to the second optical transceiver 407 is a computing node connected to the second optical transceiver 407. A destination node 444 connected to the second optical transceiver 408 is a computing node connected to the second optical transceiver 408.

The first optical transceiver may be any optical transceiver included in the network device 200, and the routing requirement of the service optical signal output by the first optical transceiver means that a service electrical signal of a source node connected to the first optical transceiver needs to be transmitted to a corresponding destination node. The wavelength selection module transmits the second optical signal having the target wavelength to the first optical transceiver connected to the wavelength selection module, to meet the routing requirement. For example, the first optical transceiver is the first optical transceiver 401. The routing requirement of the service optical signal output by the first optical transceiver 401 may mean that a service electrical signal output by the source node 431 needs to be transmitted to the destination node 443. The wavelength selection module may transmit the second optical signal having the target wavelength of λ3 to the first optical transceiver 401 based on the routing requirement and with reference to Table 1. The first optical transceiver 401 modulates the service electrical signal from the source node 431 on the second optical signal having the target wavelength λ3 to input the service optical signal to the input port 411. The optical switching module 410 crosses and transmits the service optical signal having the target wavelength λ3 from the input port 411 to the output port 423. The second optical transceiver 407 receives the service optical signal through the output port 423, and the second optical transceiver 407 obtains the service electrical signal by demodulating the service optical signal, and transmits the service electrical signal to the destination node 443.

It can be learned that, the wavelength selection module shown in this embodiment can send, to a first optical transceiver based on a routing requirement of a service optical signal output by the first optical transceiver connected to the wavelength selection module, a second optical signal with a target wavelength that meets the routing requirement. For descriptions of the routing requirement of the service optical signal output by the optical transceiver, refer to the foregoing descriptions of the routing requirement of the first optical transceiver 401. Details are not described again.

The following describes a process in which the wavelength selection module transmits the second optical signal having the target wavelength based on the routing requirement of the service optical signal output by the first optical transceiver connected to the wavelength selection module.

The wavelength selection module shown in this embodiment includes one or more input ports, and the wavelength selection module receives the M first optical signals from the light source module through the one or more input ports. The wavelength selection module includes one or more output ports. When a transceiver module includes one or more first optical transceivers, the one or more output ports included in the wavelength selection module are connected to the first optical transceivers included in the transceiver module, to send the second optical signals to the first optical transceivers included in the transceiver module.

For example, as shown in FIG. 4, the wavelength selection module transmits the second optical signal having the target wavelength of λ3 to the first optical transceiver 401 based on the routing requirement of the service optical signal output by the first optical transceiver 401, to ensure that the service optical signal output by the first optical transceiver 401 and has the target wavelength 113 can be successfully transmitted to the second optical transceiver 407 through crossing of the optical switching module. Therefore, a structure of the wavelength selection module shown in this embodiment may include the following several optional structures:

Optional Structure 1

Figure 5:
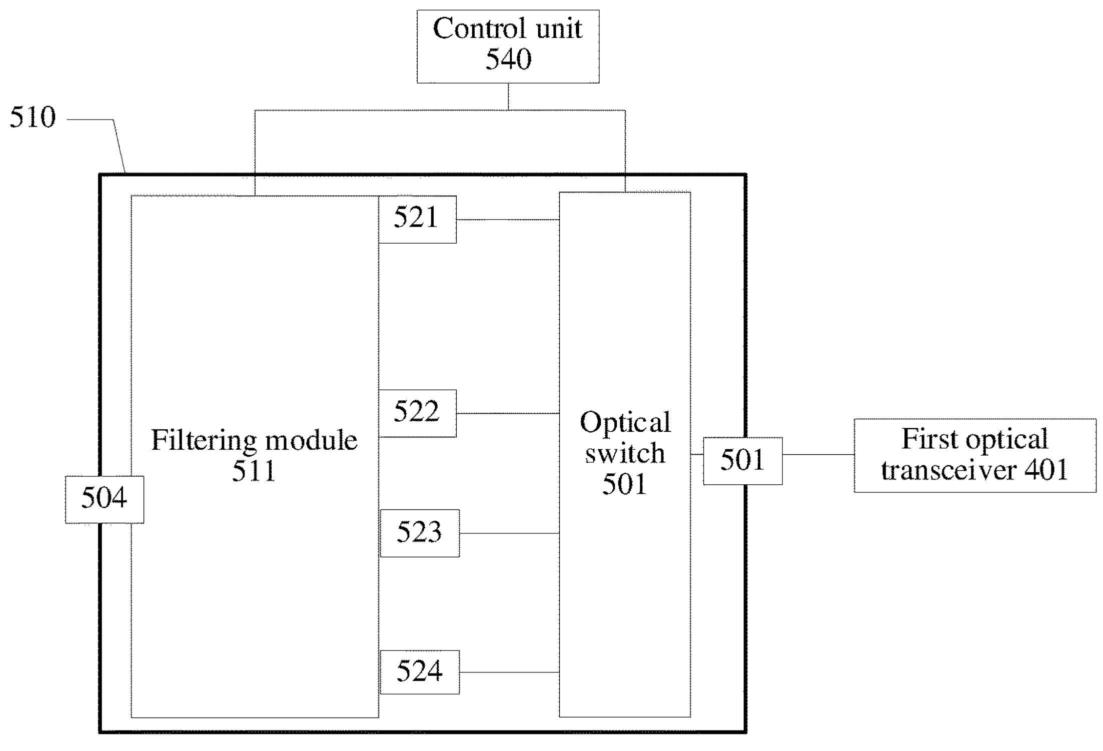
FIG. 5 is an example diagram of a partial structure of a third embodiment of a network device according to this application.

FIG. 5 is an example diagram of a partial structure of a first embodiment of a transceiver module according to this application. The transceiver module includes a wavelength selection module 510 and a first optical transceiver 401 connected to the wavelength selection module 510. The wavelength selection module 510 includes at least one filtering module and at least one optical switch. Specific descriptions of the filtering module and the optical switch that are included in the wavelength selection module 510 are not limited in this embodiment. In this embodiment, the wavelength selection module 510 includes one filtering module 511 and one optical switch 501 connected to the filtering module 511. The optical switch 501 shown in this embodiment is configured to conduct an optical path between a target first output port and a second output port. The target first output port is one of a plurality of first output ports included in the filtering module 511, and the second output port is an output port that is included in the wavelength selection module 510 and that is connected to the first optical transceiver 401. The filtering module 511 shown in this embodiment is configured to transmit, to the plurality of first output ports, a second optical signal obtained through filtering. It should be noted that, descriptions of quantities of optical switches and filtering modules and a connection manner in this embodiment are optional examples, and are not limited.

Specifically, as shown in FIG. 5, the filtering module 511 includes an input port 504, and the input port 504 is connected to a light source module. It can be learned that, the filtering module 511 receives M first optical signals from the light source module through the input port 504. The first output ports included in the filtering module 511 are a first output port 521, a first output port 522, a first output port 523, and a first output port 524. A quantity of first output ports included in the filtering module 511 is not limited in this embodiment. The first output ports included in the filtering module 511 are all connected to the optical switch 501.

If it is determined, based on a routing requirement of a service optical signal output by the first optical transceiver 401, that a second optical signal having a target wavelength λ1 needs to be sent to the first optical transceiver 401, the filtering module 511 needs to obtain the second optical signal having the target wavelength λ1 by filtering the M first optical signals. If the second optical signal having the target wavelength λ1 is output through the target first output port 521, the optical switch 501 conducts an optical path between the target first output port 521 and a second output port 505, so that the second optical signal having the target wavelength λ1 can be transmitted to the first optical transceiver 401 by sequentially passing through the target first output port 521, the optical switch 501, and the second output port 505. It can be learned that the wavelength selection module 510 can control, based on the routing requirement of the first optical transceiver 401, the wavelength selection module 510 to transmit, to the first optical transceiver 401, the second optical signal that meets the routing requirement.

A network device shown in this embodiment further includes a control unit 540. A specific position for disposing the control unit 540 is not limited in this embodiment. For example, the control unit 540 is located in the wavelength selection module 510. For another example, the control unit 540 is independently disposed in the network device, and is separately connected to the light source module and each transceiver module. For another example, the control unit 540 may be one or more computing nodes included in the network device. This is not specifically limited in this embodiment. For a specific implementation of the control unit 540 in this embodiment, refer to the foregoing descriptions of the implementation of the computing node. Details are not described again. The control unit 540 shown in this embodiment is separately connected to the filtering module 511 and the optical switch 501.

The optical switch 501 shown in this embodiment conducts or disconnects, under control of the control unit 540, an optical path between each first output port and a second input port 504. For example, in this embodiment, if the second optical signal output by the target first output port 521 needs to be transmitted to the second output port 505, the control unit 540 controls the optical switch 501 to conduct an optical path between the target first output port 521 and the second output port 505, and disconnect optical paths between the first output port 522, the first output port 523, and the first output port 524 and the second output port 505, to ensure that the second optical signal output by the target first output port 521 can be successfully transmitted to the second output port 505.

A specific implementation of the optical switch is not limited in this embodiment. For example, the optical switch in this embodiment may be a mechanical optical switch, a micro-electro-mechanical system (MEMS) optical switch, or a free-space element (for example, a prism). The optical switch 501 in this example may move or change a position, an angle, or the like of the optical switch 501 under driving of the control unit 540, to conduct the optical path between the target first output port 521 and the second output port 505. The optical switch 501 in this example may disconnect the optical paths between the first output port 522, the first output port 523, and the first output port 524 and the second output port 505 under driving of the control unit 540. For another example, the optical switch shown in this embodiment may be a non-mechanical optical switch. For example, the optical switch 501 changes a refractive index of the optical path between the target first output port 521 and the second output port 505 under control of the control unit 540, to conduct the optical path between the target first output port 521 and the second output port 505. The control unit 540 may change the refractive index of the optical path between the target first output port 521 and the second output port 505 by using an electro-optic effect, a magneto-optic effect, an acousto-optic effect, a thermo-optic effect, or the like. For another example, the optical switch 501 in this example may change refractive indexes of the optical paths between the first output port 522, the first output port 523, and the first output port 524 and the second output port 505 under control of the control unit 540.

Figure 6:
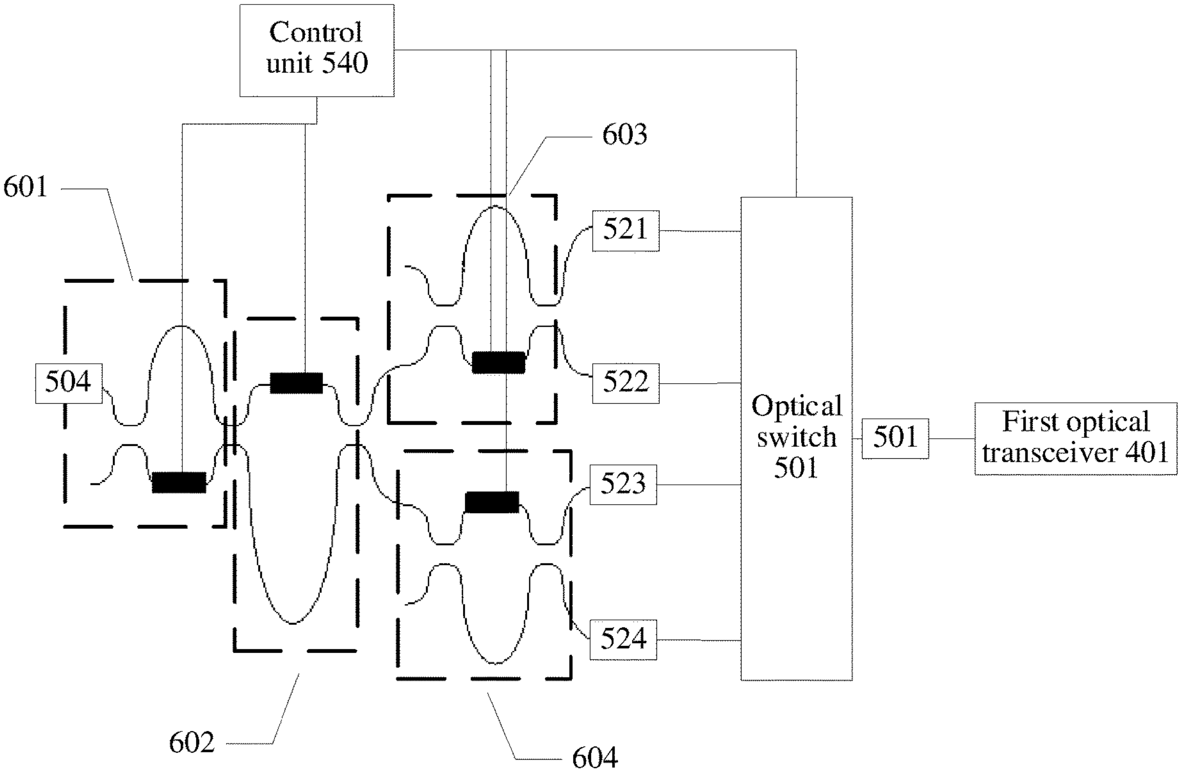
FIG. 6 is an example diagram of a structure of a first embodiment of a filtering module according to this application.

The filtering module 511 is used as an example. The filtering module 511 shown in this embodiment includes a plurality of cascaded optical filters. The following describes a structure of the filtering module 511 with reference to FIG. 6. FIG. 6 is an example diagram of a structure of a first embodiment of a filtering module according to this application.

The filtering module in this embodiment includes a first optical filter 601, a second optical filter 602 connected to the first optical filter 601, and a third optical filter 603 and a fourth optical filter 604 that are separately connected to the second optical filter 602. This embodiment is described by using an example in which each optical filter is a Mach-Zehnder interferometer (MZI). To achieve an objective that each MZI can implement filtering, an electro-optic phase shifter with a nanosecond (NS)-level response speed is configured on an interference arm included in each optical filter, and each electro-optic phase shifter is connected to the control unit 540. Two interference arms of the third optical filter 603 are respectively connected to the first output port 521 and the first output port 522, and two interference arms of the fourth optical filter 604 are respectively connected to the first output port 523 and the first output port 524.

The control unit 540 shown in this embodiment may be configured with a plurality of configuration lists, where different configuration lists include different combinations of target wavelengths. For example, for the configuration list, refer to the following Table 2.

TABLE 2

| Target wavelength | Control mode |
|---|---|
| λ1<br>λ2<br>λ3<br>λ4 | First control mode |

The configuration list indicates that, to meet a routing requirement of a service optical signal, target wavelengths of second optical signals that need to be obtained are respectively λ1, λ2, λ3, and λ4. In this case, the wavelength selection module needs to be controlled in the first control mode. Therefore, the wavelength selection module can transmit the second optical signals having the target wavelengths λ1, λ, λ3, and λ4 to the first optical transceiver, to meet the routing requirement.

For another example, for the configuration list, further refer to the following Table 3.

TABLE 3

| Target wavelength | Control mode |
|---|---|
| λ2 | Second control mode |

The configuration list indicates that, to meet a routing requirement of a service optical signal, a target wavelength of a second optical signal that needs to be obtained is λ2. In this case, the wavelength selection module needs to be controlled in the second control mode. Therefore, the wavelength selection module can transmit the second optical signal having the target wavelength λ2 to the first optical transceiver, to meet the routing requirement.

It should be noted that, a quantity of target wavelengths included in each configuration list and a specific wavelength are not limited in this embodiment, provided that different configuration lists can meet different routing requirements. The following describes an example of a process in which the control unit performs configuration based on the configuration list shown in Table 2.

First, the control unit 540 determines that the target wavelengths of the second optical signals required by the routing requirement of the service optical signal output by the first optical transceiver are λ1, λ2, λ3, and λ4. In this case, the control unit 540 determines that a configuration list that can implement the routing requirement is Table 2 shown above.

Then, the control unit 540 loads a preset first voltage or a preset first current on the electro-optic phase shifter of the first optical filter 601 based on an indication of the first control mode. The first optical filter 601 obtains the second optical signals respectively having the target wavelengths λ1, λ2, λ3, and λ4 by filtering a plurality of first optical signals input through an input port 504. For example, wavelengths of the plurality of first optical signals input through the input port 504 are λ1, λ2, λ3, λ4, to λM, and the first optical filter 601 obtains, from M first optical signals, four second optical signals respectively having the target wavelengths of λ1, λ2, λ3, and λ4. The first optical filter 601 is cascaded to the second optical filter 602. In this case, the first optical filter 601 may transmit the four second optical signals to the second optical filter 602.

Then, the control unit 540 loads a preset second voltage or a preset second current on the electro-optic phase shifter of the second optical filter 602 based on the indication of the first control mode. The second optical filter 602 can transmit the second optical signals having the target wavelengths of λ1 and λ2 to the third optical filter 603, and the second optical filter 602 can further transmit the second optical signals having the target wavelengths of λ3 and λ4 to the fourth optical filter 604.

Then, the control unit loads a preset third voltage or a preset third current on the electro-optic phase shifter of the third optical filter 603 based on the indication of the first control mode. One interference arm of the third optical filter 603 transmits the second optical signal having the target wavelength λ1 to the output port 521, and the other interference arm of the third optical filter 603 transmits the second optical signal having the target wavelength λ2 to the output port 522.

Then, the control unit loads a preset fourth voltage or a preset fourth current on the electro-optic phase shifter of the fourth optical filter 604 based on the indication of the first control mode. One interference arm of the fourth optical filter 604 transmits the second optical signal having the target wavelength λ3 to the output port 523, and the other interference arm of the fourth optical filter 604 transmits the second optical signal having the target wavelength λ4 to the output port 524.

Finally, the control unit 540 controls an optical switch 501 to conduct the optical paths between the first output port 521, the first output port 522, the first output port 523, and the first output port 524 and the second output port 505, to ensure that the second optical signals output by the first output port 521, the first output port 522, the first output port 523, and the first output port 524 and have the target wavelengths λ1, λ2, λ3, and λ4 can be successfully transmitted to the first optical transceiver 401.

Optionally, in another example, if the routing requirement of the first optical transceiver 401 requires only the second optical signal having the target wavelength λ2, the control unit 540 controls the optical switch 501 to conduct the optical path between the first output port 522 and the second output port 505, and disconnect the optical paths between the first output port 521, the first output port 523, and the first output port 524 and the second output port 505.

It can be learned that, to meet different routing requirements of the first optical transceiver, the filtering module shown in this embodiment may be implemented by configuring different control modes. The different control modes shown in this embodiment may indicate on/off of the optical switch, and for another example, may further indicate a magnitude of the voltage or current loaded by each optical filter. The control unit controls the wavelength selection module by using different control modes, so that the wavelength selection module can transmit the second optical signals having different wavelengths to the first optical transceiver, to meet different routing requirements of the service optical signals output by the first optical transceiver.

In this example, the wavelength selection module first controls filtering of the filtering module, and then controls on/off of the optical switch. In another example, on/off of the optical switch may alternatively be controlled first, and then filtering of the filtering module is controlled. This is not specifically limited in this embodiment.

Optionally, in another example, the wavelength selection module may alternatively include only the filtering module, and the second optical signal is transmitted to a target output port only by using the filtering module.

Optional Structure 2

Figures 7, 8:
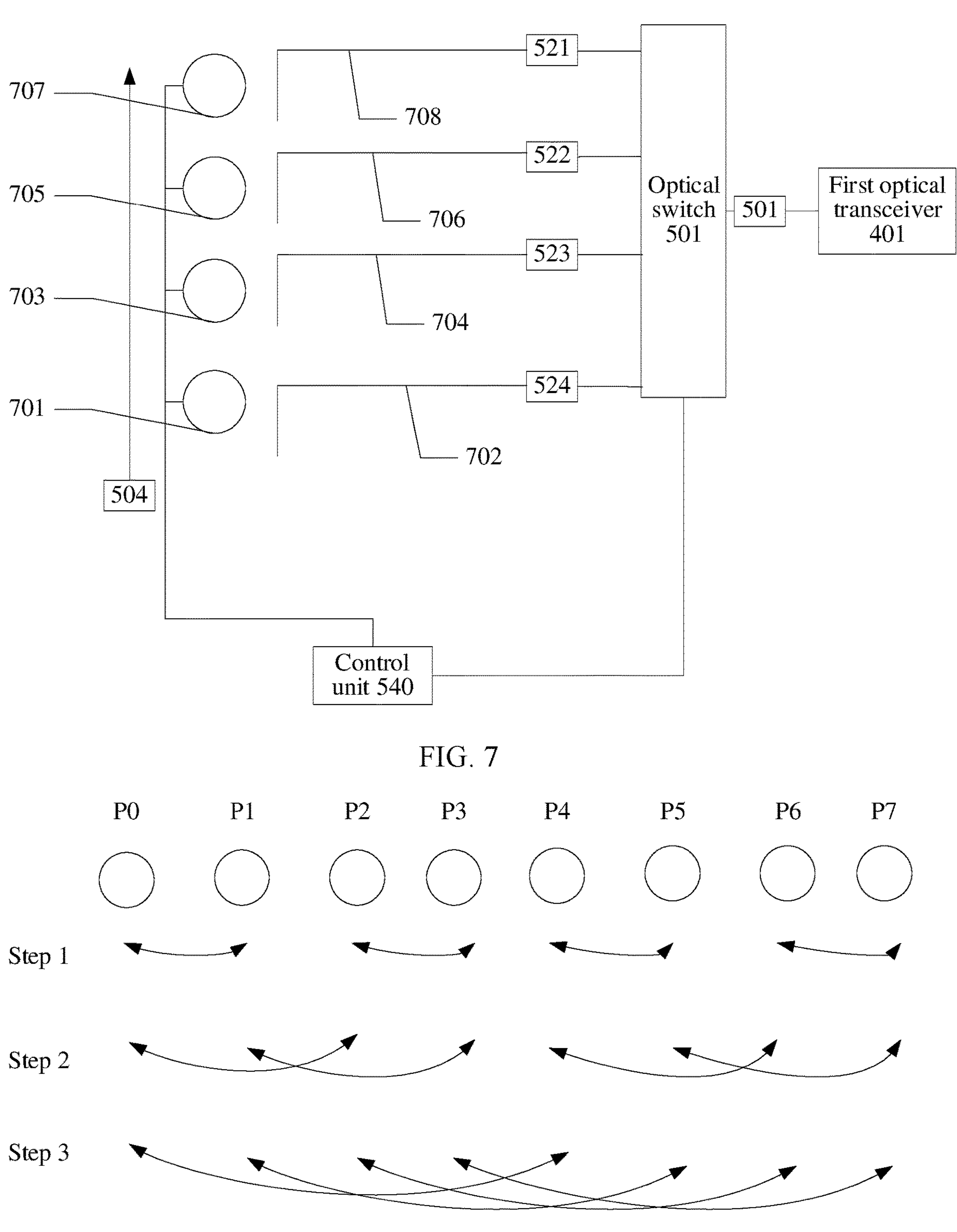
FIG. 7 is an example diagram of a structure of a second embodiment of a filtering module according to this application.
FIG. 8 is an example diagram of an application scenario of an optical network according to this application.

A difference between the optional structure 2 and the optional structure 1 lies in that a structure of a filtering module shown in this structure is different from that in the foregoing structure. For the structure of the filtering module shown in this structure, refer to FIG. 7. FIG. 7 is an example diagram of a structure of a second embodiment of a filtering module according to this application. The filtering module shown in this embodiment includes four optical filters. A first optical filter includes a first microring resonant cavity waveguide 701 and a first transmission waveguide 702, a second optical filter includes a second microring resonant cavity waveguide 703 and a second transmission waveguide 704, a third optical filter includes a third microring resonant cavity waveguide 705 and a third transmission waveguide 706, and a fourth optical filter includes a fourth microring resonant cavity waveguide 707 and a fourth transmission waveguide 708. The first microring resonant cavity waveguide 701, the second microring resonant cavity waveguide 703, the third microring resonant cavity waveguide 705, and the fourth microring resonant cavity waveguide 707 are separately connected to a control unit 540. It should be noted that, the descriptions of a quantity of optical filters included in the filtering module in this embodiment are optional examples, and are not limited.

In this example, the first transmission waveguide 702 is connected to a first output port 524, the second transmission waveguide 704 is connected to a first output port 523, the third transmission waveguide 706 is connected to a first output port 522, and the fourth transmission waveguide 708 is connected to a first output port 521.

The following describes an example of a process in which the control unit performs configuration based on the configuration list shown in Table 2.

First, the first microring resonant cavity waveguide 701, the second microring resonant cavity waveguide 703, the third microring resonant cavity waveguide 705, and the fourth microring resonant cavity waveguide 707 are disposed close to a position at which a plurality of first optical signals are input through an input port 504. The plurality of first optical signals input through the input port 504 can be separately coupled into the first microring resonant cavity waveguide 701, the second microring resonant cavity waveguide 703, the third microring resonant cavity waveguide 705, and the fourth microring resonant cavity waveguide 707. The control unit 540 determines that target wavelengths of second optical signals required by a routing requirement of a first optical transceiver are λ1, λ2, λ3, and λ4. In this case, the control unit 540 determines that a configuration list that can implement the routing requirement is Table 2 shown above.

Then, the control unit 540 loads a preset fifth voltage or a preset fifth current to the first microring resonant cavity waveguide 701 based on an indication of a first control mode, so that a light interference effect occurs on the first optical signal having the target wavelength λ4, and a resonance phenomenon occurs when a length of a round-trip optical path of the first optical signal having the wavelength λ4 in the first microring resonant cavity waveguide 701 is equal to an integer multiple of the wavelength λ4. Therefore, the second optical signal having the target wavelength λ4 is coupled into the first transmission waveguide 702 when being transmitted in the first microring resonant cavity waveguide 701, and then the second optical signal having the wavelength λ4 is transmitted to the first output port 524. By analogy, the control unit 540 loads a preset sixth voltage or a preset sixth current on the second microring resonant cavity waveguide 703 based on the indication of the first control mode, so that the first optical signal having the target wavelength λ3 is transmitted to the first output port 523. The control unit loads a preset seventh voltage or a preset seventh current on the third microring resonant cavity waveguide 705 based on an indication of the first control mode, so that the second optical signal having the target wavelength λ2 is transmitted to the first output port 522. The control unit loads a preset eighth voltage or a preset eighth current on the fourth microring resonant cavity waveguide 707 based on the indication of the first control mode, so that the second optical signal having the target wavelength λ1 is transmitted to the first output port 521.

Optionally, in another example, if the routing requirement of the first optical transceiver 401 requires only the second optical signal having the target wavelength λ2, the control unit 540 controls an optical switch 501 to conduct an optical path between the first output port 522 and a second output port 501, and disconnect optical paths between the first output port 521, the first output port 523, and the first output port 524 and the second output port 501.

It can be learned that, to meet different routing requirements of the first optical transceiver, the filtering module shown in the example may be implemented by configuring different control modes. The different control modes shown in the example may indicate on/off of the optical switch, and for another example, may further indicate a magnitude of the voltage or current loaded by each optical filter. The control unit controls a wavelength selection module by using different control modes, to ensure that the wavelength selection module can transmit the second optical signals having different wavelengths to the first optical transceiver, to meet different routing requirements of service optical signals output by the first optical transceiver.

In this example, the wavelength selection module first controls filtering of the filtering module, and then controls on/off of the optical switch. In another example, on/off of the optical switch may alternatively be controlled first, and then filtering of the filtering module is controlled. This is not specifically limited in this embodiment.

Optionally, in another example, the wavelength selection module may alternatively include only the filtering module, and the second optical signal is transmitted to a target output port only by using the filtering module.

Optional Structure 3

A difference between the optional structure 3 and the foregoing optional structure lies in that a structure of a filtering module shown in this structure is different from that in the foregoing structure. The filtering module shown in this example includes a filtering module and an optical distribution module. For descriptions of the filtering module shown in this example, refer to the structure 2. Details are not described again. It can be learned that, the filtering module can obtain a second optical signal having a target wavelength by filtering a plurality of first optical signals input from an input port. For example, the filtering module can obtain second optical signals respectively having target wavelengths λ1, λ2, λ3, and λ4 by filtering M first optical signals from the input port. The optical distribution module is configured to enable, to be sent to a first optical transceiver based on a routing requirement of a service optical signal output by the first optical transceiver, one or more of a plurality of second optical signals obtained through filtering by the filtering module. For example, the optical distribution module can transmit all of the second optical signals having the target wavelengths λ1, λ2, λ3, and λ4 to the first optical transceiver. For another example, the optical distribution module can transmit one of the second optical signals having the wavelengths λ1, λ2, λ3, and λ4 to the first optical transceiver. The optical distribution module may include one or more MZIs. For the descriptions of an implementation process of the MZI, refer to the foregoing optional structure 1. It can be learned that, a second optical signal that can meet the routing requirement of the first optical transceiver can be transmitted to the first optical transceiver based on the MZI included in the optical distribution module.

The following describes an application scenario of an optical network shown in this embodiment.

If the optical network shown in this embodiment is applied to an AI training scenario, performing AI training requires an iterative operation of a plurality of computing steps. For example, FIG. 8 is an example diagram of an application scenario of an optical network according to this application. P0 to P7 shown in FIG. 8 represent eight computing nodes configured to execute a computing task. Step 1, step 2, and step 3 represent three steps that need to be performed to execute the computing task. FIG. 8 shows a communication relationship between different computing nodes in a process of performing different steps. The computing node P0 is used as an example. For a routing table for implementing this scenario, refer to the following Table 4.

TABLE 4

| Source node | Wavelength selection module | First optical transceiver | Second optical transceiver | Destination node |
|---|---|---|---|---|
| Computing node P0 | Wavelength selection module P0 | First optical transceiver P0 | Second optical transceiver P1 | Computing node P1 |
| | | | Second optical transceiver P2 | Computing node P2 |
| | | | Second optical transceiver P4 | Computing node P4 |

The first optical transceiver P0 shown in Table 4 is a first optical transceiver connected to the computing node P0 and the wavelength selection module P0. The second optical transceiver P1 is a second optical transceiver connected to the computing node P1, and by analogy, the second optical transceiver P4 is a second optical transceiver connected to the computing node P4.

For example, in a process of performing step 1, a routing requirement corresponding to the computing node P0 is that a service electrical signal output by the computing node P0 needs to be transmitted to the computing node P1. Therefore, the computing node P0 transmits the service electrical signal to the first optical transceiver P0. The wavelength selection module P0 transmits a second optical signal having a first wavelength to the first optical transceiver P0. The first optical transceiver P0 modulates the service electrical signal on the second optical signal having the first wavelength, to transmit a service optical signal having the first wavelength to an optical switching module. The optical switching module transmits the service optical signal to the second optical transceiver P1, the second optical transceiver P1 then demodulates the service optical signal to obtain the service electrical signal, and the second optical transceiver P1 transmits the service electrical signal to the computing node P1. In this way, communication between the computing node P0 and the computing node P1 in step 1 is implemented.

In a process of performing step 2, a routing requirement corresponding to the computing node P0 is that a service electrical signal output by the computing node P0 needs to be transmitted to the computing node P2. Therefore, the computing node P0 transmits the service electrical signal to the first optical transceiver P0. The wavelength selection module P0 transmits a second optical signal having a second wavelength to the first optical transceiver P0. The first optical transceiver P0 modulates the service electrical signal on the second optical signal having the second wavelength, to transmit a service optical signal having the second wavelength to the optical switching module. The optical switching module transmits the service optical signal to the second optical transceiver P2, the second optical transceiver P2 then demodulates the service optical signal to obtain the service electrical signal, and the second optical transceiver P2 transmits the service electrical signal to the computing node P2. In this way, communication between the computing node P0 and the computing node P2 in step 1 is implemented.

It can be learned that, when the computing task is executed, if interaction and communication need to be performed between two different computing nodes, only a wavelength of an optical signal needs to be changed, and an architecture of the optical network and an architecture of any optical component included in the optical network do not need to be changed. For example, if the wavelength of the second optical signal is changed from the first wavelength to the second wavelength, the service optical signal from the first optical transceiver P0 may be changed from being transmitted to the second optical transceiver P1 to being transmitted to the second optical transceiver P2.

Different wavelength selection modules shown in this embodiment may alternatively be respectively controlled by computing nodes included in respective transceiver modules. FIG. 2 is used as an example. The wavelength selection module 243 is controlled by the computing node 241, and the wavelength selection module 246 is controlled by the computing node 244. Optionally, wavelengths of service optical signals output by different first optical transceivers connected to different optical switching modules may be the same. With reference to FIG. 1 and FIG. 2, a wavelength of a service optical signal transmitted by the first optical transceiver 242 to the optical switching module 111 may be the same as a wavelength of a service optical signal transmitted by the first optical transceiver 245 to the optical switching module 112. Although the wavelength of the service optical signal output by the first optical transceiver 242 is the same as the wavelength of the service optical signal output by the first optical transceiver 245, the two service optical signals are crossed by using two different optical switching modules. This avoids a case in which the two service optical signals are transmitted to a same output port of a same optical switching module, and avoids network congestion. Alternatively, different first optical transceivers transmit service optical signals with a same wavelength to a same optical switching module, and different service optical signals may be input to the optical switching module through different input ports of the optical switching module. This avoids a case in which a plurality of service optical signals are transmitted to a same output port of the optical switching module, and avoids network congestion. It can be learned that, each wavelength selection module can independently select a target wavelength for the first optical transceiver, and the selected target wavelength is not limited by another wavelength selection module. Because different first optical transceivers may use optical signals with a same target wavelength, utilization efficiency of M first optical signals output by a light source module is effectively improved.

It can be learned that, in the optical network shown in this embodiment, the first optical transceiver and the second optical transceiver exchange data by using the optical switching module. Specifically, the first optical transceiver and the second optical transceiver directly exchange data by using an optical signal without performing electrical-to-optical conversion. This effectively reduces a latency of data exchange between the two optical transceivers. In addition, a port of the optical switching module has no limitation on bandwidth, and the optical switching module may transmit an optical signal with a higher rate. Therefore, the optical network shown in this embodiment may provide data exchange with large bandwidth and a low latency.

When the optical network executes different computing tasks, only the wavelength selection module needs to change the wavelength of the second optical signal transmitted to the first optical transceiver. In this way, the first optical transceiver may transmit the service optical signal to different second optical transceivers, the first optical transceiver exchanges data with different second optical transceivers based on different computing tasks, and a network architecture of the optical network does not need to be changed. This reduces networking costs.

In the optical network, the light source module may uniformly send the M first optical signals to each wavelength selection module, and the wavelength selection module is responsible for transmitting a second optical signal having a corresponding target wavelength to the first optical transceiver based on the routing requirement. A wavelength combination of the M first optical signals output by the light source module does not need to be changed each time the computing task is executed, and the light source module does not need to be changed. This reduces networking costs and a latency.

In the optical network, a wavelength-tunable laser does not need to be independently configured for each first optical transceiver. This reduces costs of the first optical transceiver. The first optical transceiver directly performs modulation based on the second optical signal from the wavelength selection module without tuning the wavelength. This reduces a network latency.

Embodiment 2

Figure 9:
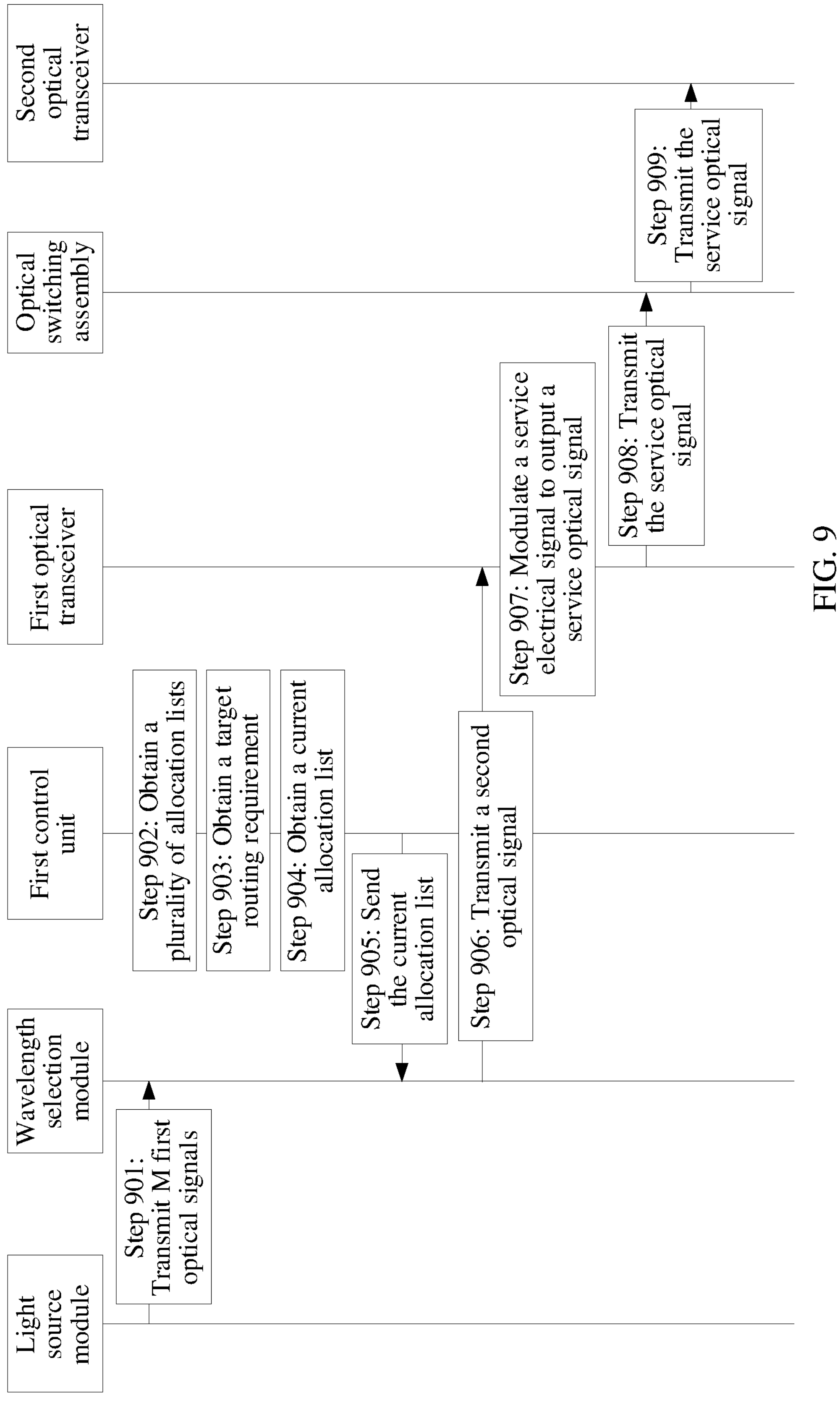
FIG. 9 is a flowchart of steps of a first embodiment of a service optical signal transmission method according to this application.

Based on the descriptions of the structure of the network device shown in Embodiment 1, this embodiment describes, with reference to FIG. 9, a process in which the network device performs a service optical signal transmission method. FIG. 9 is a flowchart of steps of a first embodiment of a service optical signal transmission method according to this application.

Step 901: Alight source module transmits M first optical signals to each wavelength selection module.

For descriptions of structures of the light source module and the wavelength selection module, refer to Embodiment 1. Details are not described in this embodiment again. The light source module shown in this example already pre-configures a wavelength of each of the M first optical signals output to each wavelength selection module and an output port that is of the light source module and through which each first optical signal passes. For example, wavelengths of the M first optical signals are respectively λ1, λ2, λ3, λ4, to λM. In this case, wavelengths of the M first optical signals transmitted by the light source module to the wavelength selection module each time are λ1, λ2, λ3, λ4, to λM. The light source module shown in this embodiment may transmit the M first optical signals to different wavelength selection modules through different output ports of the light source module. Alternatively, the light source module may transmit the M first optical signals to different wavelength selection modules in a time division manner through one or more output ports. For example, the light source module 210 determines, at a first moment, that a transceiver module 231 needs to transmit a service, and the light source module 210 transmits the M first optical signals to the transceiver module 231. The light source module determines, at a second moment, that a transceiver module 23X needs to transmit a service, and the light source module 210 transmits the M first optical signals to the transceiver module 23X. The first moment is different from the second moment.

A first control unit shown in this embodiment may determine the wavelengths of the M first optical signals based on a routing requirement of a service optical signal output by each first optical transceiver. For example, if a target wavelength that meets a routing requirement of a service optical signal output by one first optical transceiver is λK, the M first optical signals output by the light source module under control of the first control unit include a first optical signal having the target wavelength λK. For specific descriptions of the routing requirement, refer to Embodiment 1. Details are not described again. The first control unit shown in this embodiment may be independently disposed in the network device, or the first control unit shown in this embodiment may include one or more computing nodes included in the network device. For specific descriptions, refer to Embodiment 1. Details are not described again.

Step 902: The first control unit obtains a plurality of configuration lists.

The first control unit shown in this embodiment may be pre-configured with the plurality of configuration lists, and different configuration lists indicate different combinations of wavelengths of second optical signals output by the wavelength selection module. For example, refer to the two different configuration lists shown in Table 2 and Table 3 in Embodiment 1. It can be learned that in the configuration list shown in Table 2, the target wavelengths of the second optical signals output by the wavelength selection module are λ1, λ2, λ3, and λ4. However, in the configuration list shown in Table 3, the target wavelength of the second optical signal output by the wavelength selection module is λ2. For specific descriptions, refer to Embodiment 1. Details are not described again.

A sequence of performing step 901 and step 902 is not limited in this embodiment.

Step 903: The first control unit obtains a target routing requirement.

The target routing requirement shown in this embodiment is a routing requirement of a target first optical transceiver, and the target first optical transceiver is one of a plurality of first optical transceivers included in the network device. The target routing requirement shown in this embodiment means that a wavelength of a second optical signal output by the target wavelength selection module can meet a routing requirement of a service optical signal output by the target first optical transceiver, to ensure that the service optical signal output by the target first optical transceiver can be successfully transmitted to a corresponding destination node. For specific descriptions of the target first optical transceiver and a second optical transceiver, refer to Embodiment 1. Details are not described again.

A sequence of performing step 902 and step 903 is not limited in this embodiment.

Step 904: The first control unit obtains a current configuration list corresponding to the target routing requirement.

The first control unit shown in this embodiment obtains the current configuration list from the plurality of configured configuration lists. The current configuration list is a configuration list that can meet the target routing requirement. It can be learned that, the current configuration list includes a target wavelength required by the target routing requirement. Still refer to the example shown in step 903. When the target routing requirement is that target wavelengths required by the target first optical transceiver are λ1, λ2, λ3, and λ4, it can be learned that, the current configuration list corresponding to the target routing requirement is Table 2 shown in Embodiment 1. When the wavelength selection module is controlled in a first control mode indicated by the current configuration list, it can be ensured that the target wavelengths of the second optical signals output by the wavelength selection module are respectively λ1, λ2, λ3, and λ4, to meet the target routing requirement, to further ensure that the target first optical transceiver can successfully transmit the service optical signal to the corresponding destination node.

Step 905: The first control unit sends the current configuration list to the wavelength selection module.

In this embodiment, when the first control unit obtains the current configuration list, the first control unit sends the obtained current configuration list to the wavelength selection module. Specifically, the first control unit sends the current configuration list to a second control unit included in the wavelength selection module.

Step 906: The wavelength selection module transmits the second optical signal to the target first optical transceiver.

Specifically, the wavelength selection module shown in this embodiment controls the wavelength selection module based on the current configuration list, to transmit the second optical signal having the target wavelength to the target first optical transceiver.

It can be learned that, if K second optical signals are indicated by the current configuration list, the second control unit performs control based on the current configuration list, so that the K second optical signals can be transmitted to the target first optical transceiver. The K second optical signals are some or all of the M first optical signals.

For a process in which the second control unit included in the wavelength selection module performs control based on, for example, the current configuration list shown in Table 2, refer to the control process of the control unit shown in Embodiment 1. Details are not described again. It can be learned that, the second control unit shown in this embodiment controls the wavelength selection module based on the current configuration list shown in Table 2, to ensure that the target wavelengths of the second optical signals that can be output by the wavelength selection module to the target first optical transceiver are λ1, λ2, λ3, and λ4.

In this embodiment, that the second control unit located in the wavelength selection module controls the wavelength selection module is used as an example. In another example, the first control unit may directly control the wavelength selection module. This is not specifically limited in this embodiment.

Step 907: The target first optical transceiver modulates a service electrical signal on each second optical signal to output a service optical signal.

It can be learned that, any target first optical transceiver included in the network device can modulate the K second optical signals from the wavelength selection module to output K service optical signals. For descriptions of a specific process in which the target first optical transceiver performs modulation on the second optical signal, refer to Embodiment 1. Details are not described in this embodiment again.

Step 908: The target first optical transceiver transmits the service optical signal to an optical switching assembly.

The optical switching assembly shown in this embodiment may include one or more optical switching modules. For specific descriptions of the optical switching module, refer to the descriptions in Embodiment 1. Details are not described again. For example, as shown in FIG. 1, the optical switching assembly includes the optical switching module 111, the optical switching module 112, the optical switching module 113, and the optical switching module 114. The optical switching assembly can receive the K service optical signals of the target first optical transceiver. For example, the target first optical transceiver can output the K service optical signals to one optical switching module through one output port. For another example, the target first optical transceiver can output at least one service optical signal to four optical switching modules through four output ports. The optical switching assembly can transmit each service optical signal to a corresponding second optical transceiver based on a wavelength of each service optical signal. It can be learned that, each second optical transceiver can receive one or more service optical signals. For specific descriptions of the second optical transceiver, refer to the descriptions in Embodiment 1. Details are not described again.

Step 909: The optical switching assembly transmits the service optical signal to the second optical transceiver.

It can be learned from Embodiment 1 that, the optical switching module is a wavelength-sensitive optical component. In other words, each optical switching module performs crossing based on the wavelength of the service optical signal, to transmit the service optical signal to the corresponding second optical transceiver. In this embodiment, when the second optical transceiver receives the service optical signal, the second optical transceiver can demodulate the service optical signal to obtain a service electrical signal, and transmit the service electrical signal to a computing node connected to the second optical transceiver. The computing node performs corresponding processing based on the service electrical signal.

For descriptions of beneficial effects shown in this embodiment, refer to Embodiment 1. Details are not described again.

Embodiment 3

Figure 10:
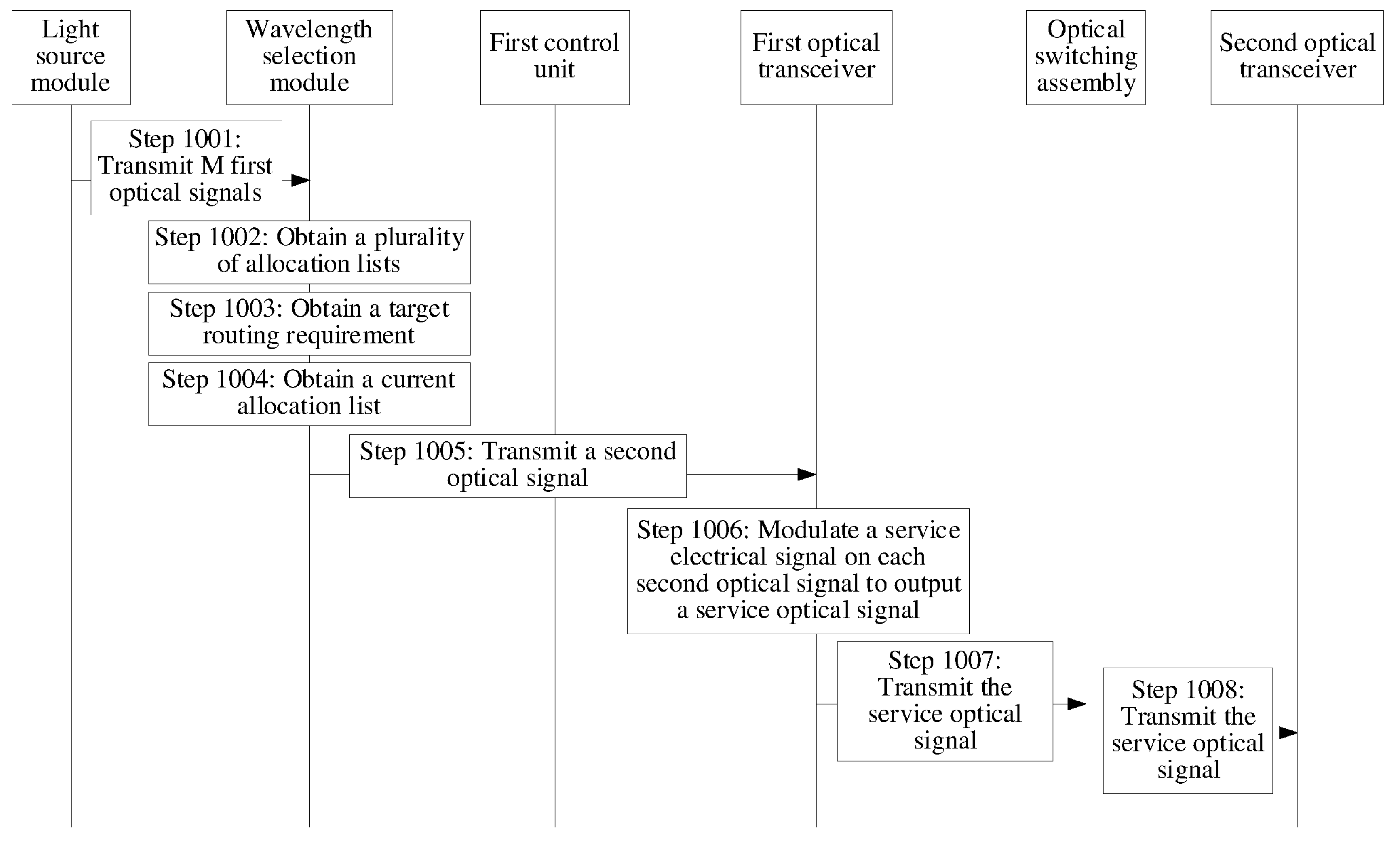
FIG. 10 is a flowchart of steps of a second embodiment of a service optical signal transmission method according to this application.

A difference between this embodiment and Embodiment 2 lies in that entities that obtain current configuration lists are different. For a process of performing a service optical signal transmission method shown in this embodiment, refer to FIG. 10. FIG. 10 is a flowchart of steps of a second embodiment of a service optical signal transmission method according to this application.

Step 1001: A light source module transmits M first optical signals to each wavelength selection module.

For descriptions of a process of performing step 1001 shown in this embodiment, refer to step 901 shown in Embodiment 2. A specific execution process is not described again.

Step 1002: The wavelength selection module obtains a plurality of configuration lists.

A second control unit included in the wavelength selection module in this embodiment obtains the plurality of configuration lists. For descriptions of a specific position of the second control unit, refer to the descriptions shown in Embodiment 2. Details are not described again. For descriptions of a process in which the second control unit obtains the plurality of configuration lists, refer to the descriptions of the process in which the first control unit obtains the plurality of configuration lists shown in step 902 in Embodiment 2. Details are not described in this embodiment again.

Step 1003: The wavelength selection module obtains a target routing requirement.

For a process in which the second control unit of the wavelength selection module obtains the routing requirement, refer to the descriptions of the process in which the first control unit obtains the routing requirement shown in step 903 in Embodiment 2. Details are not described again.

Step 1004: The wavelength selection module obtains a current configuration list corresponding to the target routing requirement.

For a process in which the second control unit of the wavelength selection module obtains the current configuration list corresponding to the target routing requirement, refer to the descriptions of the process in which the first control unit obtains the current configuration list corresponding to the target routing requirement shown in step 904 in Embodiment 2. Details are not described again.

Step 1005: The wavelength selection module transmits a second optical signal to a target first optical transceiver.

Specifically, the wavelength selection module controls the wavelength selection module based on the current configuration list, to transmit a second optical signal having a target wavelength to the target first optical transceiver. The target first optical transceiver is any first optical transceiver included in a network device, and the first optical transceiver is connected to the wavelength selection module. For specific descriptions of the target first optical transceiver, refer to Embodiment 2. Details are not described again. For descriptions of a process in which the wavelength selection module controls the wavelength selection module based on the current configuration list, refer to the descriptions of the control process of the wavelength selection module shown in step 906 of Embodiment 2. Details are not described again.

Step 1006: The target first optical transceiver modulates a service electrical signal on each second optical signal to output a service optical signal.

Step 1007: The target first optical transceiver transmits the service optical signal to an optical switching assembly.

Step 1008: The optical switching assembly transmits the service optical signal to a second optical transceiver.

For descriptions of a process of performing step 1006 to step 1008 shown in this embodiment, refer to the descriptions of the process of performing step 907 to step 909 shown in Embodiment 2. Details are not described again.

For descriptions of beneficial effects shown in this embodiment, refer to Embodiment 1. Details are not described again.

Embodiment 4

Figure 11:
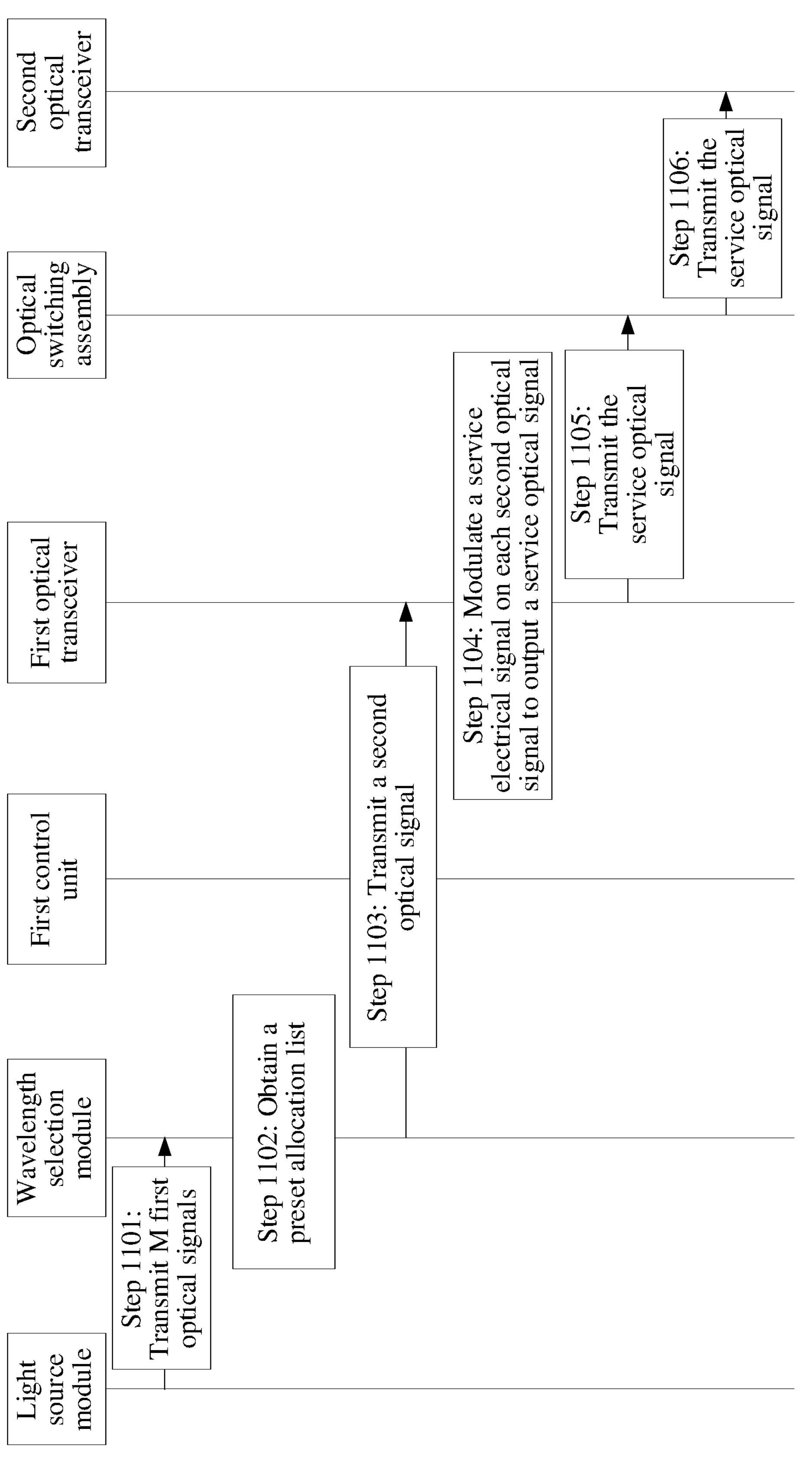
FIG. 11 is a flowchart of steps of a third embodiment of a service optical signal transmission method according to this application.

In Embodiment 2 and Embodiment 3, the network device needs to dynamically control the wavelength selection module based on the routing requirement of the target first optical transceiver. It can be learned that, when the routing requirements of the target first optical transceiver are different, the wavelength selection module is controlled based on different configuration lists. However, preset control is performed on a wavelength selection module in this embodiment, and the wavelength selection module can transmit second optical signals having a same wavelength to a target first optical transceiver each time. The following describes, with reference to FIG. 11, a process of performing a service optical signal transmission method in this embodiment. FIG. 11 is a flowchart of steps of a third embodiment of a service optical signal transmission method according to this application.

Step 1101: A light source module transmits M first optical signals to each wavelength selection module.

For a specific process of performing step 1101 shown in this embodiment, refer to step 901 shown in Embodiment 2. Details are not described again.

Step 1102: The wavelength selection module obtains a preset configuration list.

A second control unit included in the wavelength selection module shown in this embodiment pre-configures the preset configuration list, and the preset configuration list can meet a routing requirement of a service optical signal of each first optical transceiver. For descriptions of the second control unit included in the wavelength selection module, refer to the descriptions shown in Embodiment 3. Details are not described again. For descriptions of the preset configuration list, refer to the descriptions of the configuration list shown in Embodiment 1. Details are not described again. Fixed control may be performed, based on the preset configuration list, on the wavelength selection module shown in this embodiment, to ensure that the wavelength selection module always outputs the second optical signals having the same target wavelength. In this way, it is ensured that a target first optical transceiver connected to the wavelength selection module in a network device can always receive the second optical signals having the same wavelength. For example, the target wavelength of the second optical signal received by the target first optical transceiver is always λK.

Step 1103: The wavelength selection module transmits the second optical signal to the target first optical transceiver.

Specifically, the wavelength selection module is controlled based on the preset configuration list, to transmit the second optical signal having the target wavelength to the target first optical transceiver.

For a process of performing step 1103 shown in this embodiment, refer to the process in which the wavelength selection module controls the wavelength selection module based on the current configuration list shown in step 1005 in Embodiment 3. Details are not described again.

Step 1104: The target first optical transceiver modulates a service electrical signal on each second optical signal to output a service optical signal.

Step 1105: The target first optical transceiver transmits the service optical signal to an optical switching assembly.

Step 1106: The optical switching assembly transmits the service optical signal to a second optical transceiver.

For descriptions of a process of performing step 1104 to step 1106 shown in this embodiment, refer to the descriptions of the process of performing step 1006 to step 1008 shown in Embodiment 3. Details are not described again.

It can be learned that in the transmission method shown in this embodiment, the target first optical transceiver and the second optical transceiver exchange data by using an optical switching module. The target first optical transceiver and the second optical transceiver directly exchange data by using an optical signal without performing electrical-to-optical conversion. This effectively reduces a latency of data exchange between the two optical transceivers. In addition, a port of the optical switching module has no limitation on bandwidth, and the optical switching module may transmit an optical signal with a higher rate. Therefore, an optical network shown in this embodiment may provide data exchange with large bandwidth and a low latency.

The optical network may separately send the M first optical signals to each wavelength selection module by using the light source module, and the wavelength selection module is responsible for transmitting the second optical signal having the corresponding target wavelength based on the preset configuration list, without performing an action of querying the current configuration list each time a computing task is executed. This improves optical signal transmission efficiency.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, and such modifications or replacements do not cause the essence of the corresponding technical solutions to depart from the spirit and scope of embodiments of the present invention.

The invention claimed is:

1. A service optical signal transmission method, wherein the method comprises:

transmitting, by a light source module in a network device, M first optical signals to each of a plurality of wavelength selection modules that are connected to the light source module, wherein M is a positive integer greater than 1, wherein each of the plurality of wavelength selection modules is connected to a respective first optical transceiver, and different wavelength selection modules are connected to different first optical transceivers;

transmitting, by each of the plurality of wavelength selection modules, K second optical signals to the respective first optical transceiver, wherein K is a positive integer less than or equal to M, wherein the transmitting, by each of the plurality of the wavelength selection modules, K second optical signals to the respective first optical transceiver comprises:

transmitting, by a respective wavelength selection module of the plurality of the wavelength selection modules, a second optical signal having a target wavelength to a target output port of the respective wavelength selection module, wherein the target wavelength is determined based on a routing requirement of the service optical signal, and the target output port has a correspondence with the target wavelength; or transmitting, by a respective wavelength selection module of the plurality of the wavelength selection modules, a second optical signal having a target wavelength to the respective first optical transceiver based on a correspondence between the target wavelength and the respective first optical transceiver, wherein the target wavelength is a wavelength transmitted to the respective wavelength selection module; and modulating, by the respective first optical transceiver, a service electrical signal on each of the K second optical signals to output K service optical signals.

2. The transmission method according to claim 1, wherein a plurality of first optical transceivers are in one-to-one correspondence with a plurality of output ports of a same optical switching module, and each of the plurality of first optical transceivers is configured to transmit the service optical signal to the output port corresponding to the optical switching module.

3. The transmission method according to claim 2, wherein the output port that is of the optical switching module and that is configured to output the service optical signal is related to a wavelength of the service optical signal and an input port that is of the optical switching module and that is configured to receive the service optical signal.

4. The transmission method according to claim 1, wherein the transmitting, by each of the plurality of the wavelength selection modules, K second optical signals to the respective first optical transceiver comprises:

obtaining, by the respective wavelength selection module of the plurality of the wavelength selection modules, a current configuration list, wherein the current configuration list comprises the correspondence between the target wavelength and the respective first optical transceiver.

5. The transmission method according to claim 4, wherein the network device comprises a controller connected to the respective wavelength selection module, and the method further comprises:

obtaining, by the controller, a plurality of configuration lists;

obtaining, by the controller, a routing requirement, wherein the routing requirement comprises a source node and a destination node of the service optical signal, the source node is connected to the respective first optical transceiver, and the destination node is connected to a second optical transceiver;

obtaining, by the controller, the current configuration list corresponding to the routing requirement, wherein a service optical signal output by the respective first optical transceiver and has the target wavelength is transmitted to the second optical transceiver by using the optical switching module; and sending, by the controller, the current configuration list to the respective wavelength selection module.

6. The transmission method according to claim 4, wherein the obtaining, by the respective wavelength selection module, a current configuration list comprises:

obtaining, by the respective wavelength selection module, a plurality of configuration lists;

obtaining, by the respective wavelength selection module, a routing requirement, wherein the routing requirement comprises a source node and a destination node of the service optical signal, the source node is connected to the respective first optical transceiver, and the destination node is connected to a second optical transceiver; and obtaining, by the respective wavelength selection module, the current configuration list corresponding to the routing requirement, wherein a service optical signal output by the respective first optical transceiver and has the target wavelength is transmitted to the second optical transceiver by using the optical switching module.

7. The transmission method according to claim 4, wherein the transmitting, by the respective wavelength selection module, a second optical signal having the target wavelength to the respective first optical transceiver based on the current configuration list comprises:

conducting, by the respective wavelength selection module, an optical path between a target input port and a target output port of the respective wavelength selection module based on the current configuration list, wherein the target input port is an input port configured to input a first optical signal having the target wavelength, and the target output port is an output port configured to output the second optical signal having the target wavelength to the respective first optical transceiver.

8. The transmission method according to claim 1, wherein each of the plurality of wavelength selection modules further comprises at least one optical filter, and the transmitting, by each of the plurality of wavelength selection modules, K second optical signals to the respective first optical transceiver comprises:

obtaining, by a respective wavelength selection module of the plurality of the wavelength selection modules, the K second optical signals by filtering the M first optical signals by using the at least one optical filter.

9. A network device, wherein the network device comprises a light source module, the light source module is connected to a plurality of wavelength selection modules, each of the plurality of wavelength selection modules is connected to a respective first optical transceiver, and different wavelength selection modules are connected to different first optical transceivers;

the light source module is configured to transmit M first optical signals to each of the plurality of wavelength selection modules, wherein M is a positive integer greater than 1;

each of the plurality of wavelength selection modules is configured to transmit K second optical signals to the respective first optical transceiver, wherein K is a positive integer less than or equal to M, wherein each of the plurality of wavelength selection modules is configured to transmit a second optical signal having a target wavelength to the respective first optical transceiver, and wherein the target wavelength is a wavelength transmitted to the respective wavelength selection module; and the respective first optical transceiver is configured to modulate a service electrical signal on each of the K second optical signals to output K service optical signals.

10. The network device according to claim 9, wherein a plurality of first optical transceivers are in one-to-one correspondence with a plurality of output ports of a same optical switching module, and each of the plurality of first optical transceivers is configured to transmit the service optical signal to the output port corresponding to the optical switching module.

11. The network device according to claim 10, wherein the output port that is of the optical switching module and that is configured to output the service optical signal is related to a wavelength of the service optical signal and an input port that is of the optical switching module and that is configured to receive the service optical signal.

12. The network device according to claim 9, wherein each of the plurality of wavelength selection modules is configured to:

obtain a current configuration list, wherein the current configuration list comprises a correspondence between a target wavelength and the respective first optical transceiver, and the target wavelength is a wavelength to be transmitted to the respective wavelength selection module; and transmit a second optical signal having the target wavelength to the respective first optical transceiver based on the current configuration list.

13. The network device according to claim 12, wherein the network device comprises a controller connected to the respective wavelength selection module, and the controller is configured to:

obtain a plurality of configuration lists;

obtain a routing requirement, wherein the routing requirement comprises a source node and a destination node of the service optical signal, the source node is connected to the respective first optical transceiver, and the destination node is connected to a second optical transceiver;

obtain the current configuration list corresponding to the routing requirement, wherein a service optical signal output by the respective first optical transceiver and has the target wavelength is transmitted to the second optical transceiver by using the optical switching module; and send the current configuration list to the respective wavelength selection module.

14. The network device according to claim 12, wherein the respective wavelength selection module is configured to:

obtain a plurality of configuration lists;

obtain a routing requirement, wherein the routing requirement comprises a source node and a destination node of the service optical signal, the source node is connected to the respective first optical transceiver, and the destination node is connected to a second optical transceiver; and obtain the current configuration list corresponding to the routing requirement, wherein a service optical signal output by the respective first optical transceiver and has the target wavelength is transmitted to the second optical transceiver by using the optical switching module.

15. The network device according to claim 12, wherein the respective wavelength selection module is configured to conduct an optical path between a target input port and a target output port of the respective wavelength selection module based on the current configuration list, wherein the target input port is an input port configured to input a first optical signal having the target wavelength, and the target output port is an output port configured to output the second optical signal having the target wavelength to the respective first optical transceiver.

16. The network device according to claim 9, wherein the respective wavelength selection module further comprises at least one optical filter, and the respective wavelength selection module is configured to obtain the K second optical signals by filtering the M first optical signals by using the at least one optical filter.

17. An optical network, wherein the optical network comprises a plurality of optical transceivers, the plurality of optical transceivers comprise N first optical transceivers and at least one second optical transceiver, the N first optical transceivers are connected to the at least one second optical transceiver by using at least one optical switching module, the N first optical transceivers are located in a network device; and the at least one optical switching module is configured to transmit K service optical signals from the N first optical transceivers to the at least one second optical transceiver, wherein:

the network device comprises a light source module, the light source module is connected to a plurality of wavelength selection modules, each of the plurality of wavelength selection modules is connected to a respective first optical transceiver, and different wavelength selection modules are connected to different first optical transceivers;

the light source module is configured to transmit M first optical signals to each of the plurality of wavelength selection modules, wherein M is a positive integer greater than 1;

each of the plurality of wavelength selection modules is configured to transmit K second optical signals to the respective first optical transceiver, wherein K is a positive integer less than or equal to M, wherein each of the plurality of wavelength selection modules is configured to transmit a second optical signal having a target wavelength to the respective first optical transceiver, and wherein the target wavelength is a wavelength transmitted to the respective wavelength selection module; and the respective first optical transceiver is configured to modulate a service electrical signal on each of the K second optical signals to output K service optical signals.

18. The optical network according to claim 17, wherein the N first optical transceivers and the second optical transceiver are located in the same network device, or the N first optical transceivers and the second optical transceiver are located in different network devices.

19. The optical network according to claim 17, wherein a plurality of first optical transceivers are in one-to-one correspondence with a plurality of output ports of a same optical switching module, and each of the plurality of first optical transceivers is configured to transmit the service optical signal to the output port corresponding to the optical switching module.

20. The optical network according to claim 19, wherein the output port that is of the optical switching module and that is configured to output the service optical signal is related to a wavelength of the service optical signal and an input port that is of the optical switching module and that is configured to receive the service optical signal.

* * * * *